US007294370B2

(12) United States Patent
Lavrentovich et al.

(10) Patent No.: US 7,294,370 B2
(45) Date of Patent: Nov. 13, 2007

(54) ALIGNED LYOTROPIC CHROMONIC LIQUID CRYSTAL FILMS

(75) Inventors: Oleg Lavrentovich, Kent, OH (US); Tod Schneider, Kent, OH (US); Andrii Golovin, Kent, OH (US); Jong-Chan Lee, Seoul (KR)

(73) Assignee: Kent State University, Kent, OH (US)

( * ) Notice: Subject to any disclaimer, the term of this patent is extended or adjusted under 35 U.S.C. 154(b) by 406 days.

(21) Appl. No.: 10/920,551

(22) Filed: Aug. 17, 2004

(65) Prior Publication Data

US 2006/0040069 A1 Feb. 23, 2006

(51) Int. Cl.
*C09K 19/60* (2006.01)
*C09K 19/58* (2006.01)
*G05B 5/30* (2006.01)

(52) U.S. Cl. .................. 428/1.2; 252/299.1; 252/299.2
(58) Field of Classification Search .................. 428/1.2, 428/1.25, 1.26; 252/299.1, 299.2
See application file for complete search history.

(56) References Cited

U.S. PATENT DOCUMENTS

| 2,400,877 | A | 5/1946 | Dreyer |
| 2,544,659 | A | 3/1951 | Dreyer |
| 5,596,434 | A | 1/1997 | Walba et al. |
| 6,171,802 | B1 | 1/2001 | Woolverton |
| 6,245,255 | B1 | 6/2001 | Helber et al. |
| 6,264,967 | B1 | 7/2001 | Ito et al. |
| 6,411,354 | B1* | 6/2002 | Lavrentovich et al. ........ 349/84 |
| 6,541,185 | B1 | 4/2003 | Matsunaga et al. |
| 6,570,632 | B2 | 5/2003 | Lavretovich et al. |
| 6,645,578 | B2 | 11/2003 | Sahouani et al. |
| 6,673,398 | B2 | 1/2004 | Schneider et al. |
| 6,699,533 | B2 | 3/2004 | Sahouani et al. |
| 2002/0066885 | A1* | 6/2002 | Sahouani et al. ........ 252/299.1 |

OTHER PUBLICATIONS

Sergan, et al, "Polarizing-Alignment Layers for Twisted Nematic Cells," Liquid Crystals, Taylor & Francis Ltd, vol. 27 (No. 5), p. 567-572, (2000).
Schneider, et al, "Imaging Oriented Aggregates of Lyotropic Chromonic Mesogenic Dyes by Atomic Force Microscopy," Mat. Res. Soc. Symp., Materials Research Society, vol. 636, p. D11.8.1-D11.8.5, (2001).
Schneider, et al, "Self-Assembled monolayers and Multilayered Stacks of Lybotropic Chromonic Liquid Crystalline Dyes with In-Plance Orientational Order," Langumuir, vol. 16 (No. 12), p. 5227-5230.

(Continued)

*Primary Examiner*—Shean C Wu
(74) *Attorney, Agent, or Firm*—Hahn Loeser & Parks, LLP; John J. Cunniff

(57) ABSTRACT

An aligned film comprises a dried mixture of a lyotropic chromonic liquid crystal material and a dopant selected from the group consisting of dyes having a molecular weight within one order of magnitude of the liquid crystal material and block co-polymers. An example of an aligned film may be transparent to visible light but not transparent to polarized light in the ultraviolet and/or infra-red portions of the electromagnetic spectrum. A method of making an aligned lyotropic chromonic liquid crystal-based film comprises providing a mixture of a lyotropic chromonic liquid crystal material and a dopant in a solvent for the liquid crystal material, applying the mixture to a substrate, and removing the solvent to produce an aligned lyotropic chromonic liquid crystal-based film.

20 Claims, 12 Drawing Sheets

Polarization Efficiency of LCLC Film +/- Dopant

OTHER PUBLICATIONS

Lavrentovich, et al, "Planar and Twisted Lyotropic Chromonic Liquid Crystal Cells as Optical Compensators for Twisted Nematic Displays," Liquid Crystals, Taylor & Francis Ltd, vol. 30 (No. 7), p. 851-859, (2003).

Ramesh, et al, "An Invenstigation of the Micropolarity of Several Aqueous Nematic Lyotropic Liquid Crystals," J. Phys. Chem., American Chemical Society, p. 5937-5940, (1987).

Tam-Chang, et al, "Ionic Quaterrylenebis(dicarboximide): A Novel Mesogen and Long-Wavelength Polarizing Material," Angew. Chem. Int. Ed., vol. 42 (No. 8), p. 897-900, (2003).

Hui, et al, "Structure and Order Parameter of a Nematic Lyotropic Liquid Crystal Studied by FTIR Spectroscopy," J. Phys. Chem., American Chemical Society, p. 4064-4067, (Aug. 10, 1986).

Lavrentovich, et al, "Patterns in Thin Liquid Crystal Firms and the Divergence ("Surfacelike") Elasticity," International Journal of Modern Physics B, World Scientific Publishing Company, vol. 9 (No. 18&19), p. 2389-2437, (1995).

Yu, et al, "Deuteron Resonance of D2O of Nematic Disodium Cromoglycate-Water Systems," Mol. Cryst. Liq. Crst., Gordon and Breach Science Publishers, Inc., p. 129-134, (1982).

Lydon, John, in "Handbook of Liquid Crystals, vol.2B: Low Molecular Weight Liquid Crystals II", Chapter XVIII, "Chromonics", (Demus et al, ed) pp. 981-1007, (1998).

Hartshorne, et al, "Memosmorphism in the System Disodium Chromoglycate-Water," Molecular Crystals and Liquid Crystals, Gordon and Breach Science Publishers (Great Britian), vol. 23, p. 343-368, (1973).

Tiddy, et al, "Highly Ordered Aggregates in Dilute Dye-Water Systems," Langmuir, American Chemical Society, vol. 11, p. 390-393, (1995).

Sergan, et al, "Negative Uniaxial Films from Lyotropic Liquid Crystalline Material for Liquid Crystal Display Applications," Liquid Crystals, Taylor & Francis Ltd., vol. 27 (No. 11), p. 1481-1484, (2000).

Yip, et al, "Photo-patterned E-wave Polarizer," Displays, Elsevier Science B.V., vol. 22, p. 27-32, (2001).

Ruslim, et al, "Optical and Surface Morphological Properties of Polarizing Flims Fabricated from a Chromonic Dye by the Photoalignment Technique," Langmuire, American Chemical Society, vol. 20, p. 95-100, (2004).

Remizov, et al, "Rheology of the Lyotroic Liquid Crystalline Material for Thin Film Polarizers," Mol. Materials, Gordon and Breach Science Publishers, vol. 14, p. 179-190, (2001).

Matsuanga, et al, "Photofabrication of Micro-Patterned Polarizing Elements for Stereoscopic Displays," Advanced Materials, Wiley-VCH, vol. 14 (No. 20), p. 1477-1480, (2002).

Bobrov, et al, "Lyotropic Thin Film Polarizers," SID 00 Digest, SID, p. 1103-1105, (2000).

Tam-Chang, et al, "Study of the Chromonic Liquid-Crystalline Phases of Bis-(N,N-diethylaminoethyl)perylene-3,4,9,10-tetracarboxylic Diimide Dihydrochloride by Polarized Optical Microscopy and 2H NMR Sectropscopy," Langmuir, American Chemical Society, vol. 20, p. 342-347, (2004).

Camorani, et al, "Absorption Spectra and Chromonic Phase in Aqueous Solution of Perylenetetracarboxylic Bisimides Derivatives," Semiconductor Physics, Quantum Electronics & Optoelectronics, Institute of Semiconductor Physics, vol. 4 (No. 3), p. 229-238, (2001).

Goldfarb, et al, "Structural and Orientational Characteristics of the Disodium/Cromoglycate-Water Mesophases by Deuterium NMR and X-Ray Diffraction," Mol. Cryst. Liq. Cryst., Gordon and Breach Science Publishers, Inc. vol. 126, p. 225-246, (1985).

* cited by examiner

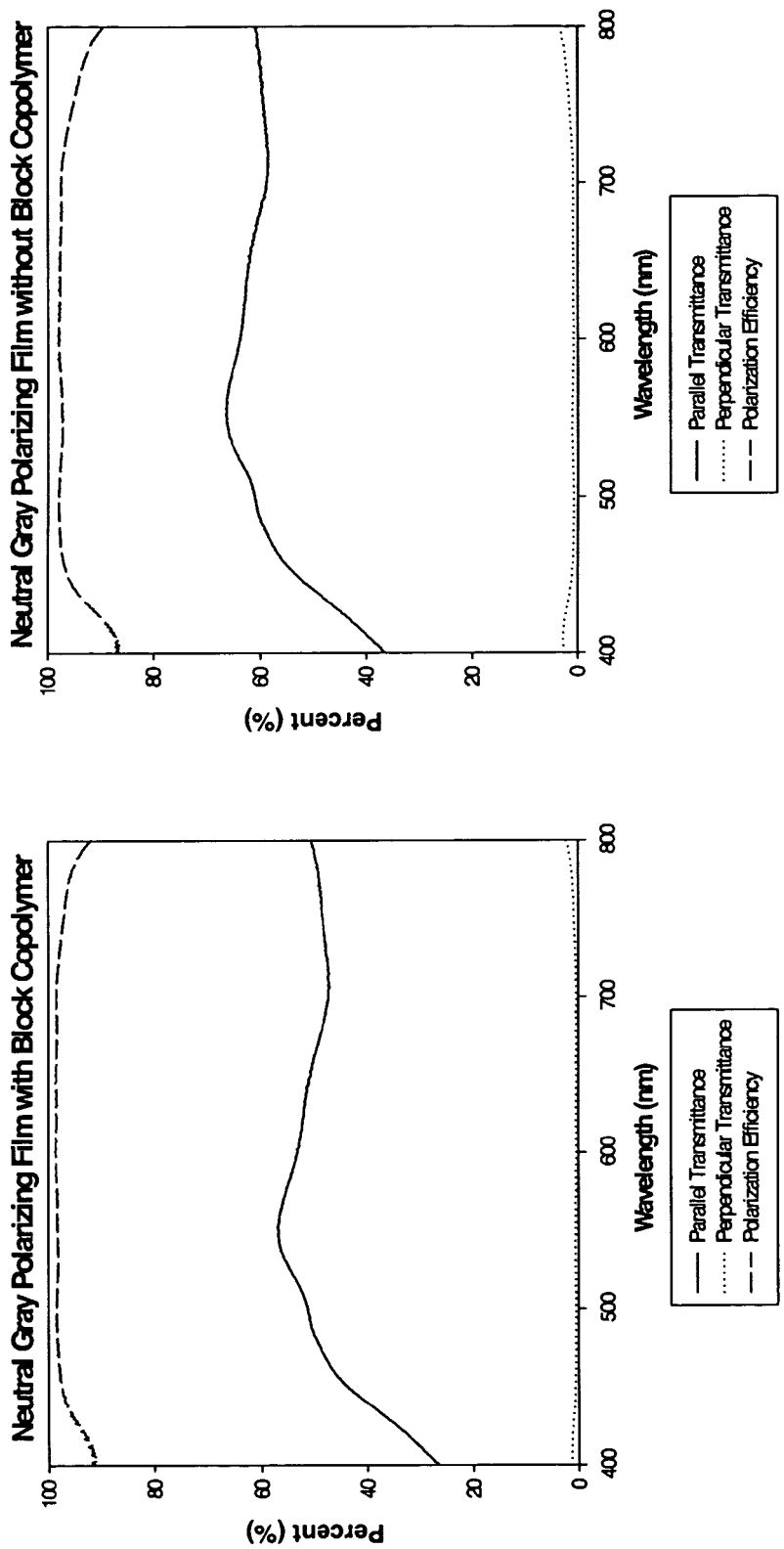

Polarization Characteristics Of Blue 27 Films

Application of LCLC to Substrate

DSCG Film

Transmission vs. Wavelength for DSCG Film

Transmission vs. Wavelength for LCLC+BC(b) Film

Polarization Efficiency vs. Wavelength for LCLC and LCLC+BC(b) Films

LCLC+BC(b) Film

LCLC+BC(a) Film

Transmittance of LCLC Film with Fast Violet B Dye

Polarization Efficiency of LCLC Film +/- Dopant

LCLC + Fast Violet B Dye Film

LCLC + Fast Violet B Dye

Polarization Efficiency of Film with 2,2'-Dihydroxybenzophenone

Transmission Spectrum of Film with IR-806

Polarization Efficiency of Film with IR-806

ALIGNED LYOTROPIC CHROMONIC LIQUID CRYSTAL FILMS

TECHNICAL FIELD

This invention relates to aligned films prepared from lyotropic chromonic liquid crystals that are suitable for a variety of uses such as polarizing and optical compensating films for visible, ultraviolet and infrared parts of the electromagnetic spectrum. More particularly, this invention relates to lyotropic chromonic liquid crystal films with improved alignment properties. This invention also relates to lyotropic chromonic liquid crystal films that are transparent in a predetermined portion of the electromagnetic spectrum and adsorb light of a predetermined polarization in another predetermined portion of the spectrum.

BACKGROUND OF THE INVENTION

It is well known that there are three states of matter: solids, liquid and gases. There is, however, a special fourth state of matter referred to as the liquid crystals (LCs) or mesomorphic states, intermediate between the solids and liquids. In the LC state, the material possesses long-range orientational order of the constituent units (molecules or molecular aggregates) while the long-range positional order of these units is partially or completely lost. The intermediate character of order is responsible for high sensitivity of LCs to external factors, such as the presence of electromagnetic fields or interface with another medium and also for unique optical and structural properties used in a variety of applications, ranging from computer monitors and other types of visual display systems commonly referred to as liquid crystal displays or LCDs, to materials of superior tensile strength such as Kevlar. The development of new properties and improvement of previously known properties may expand the number of applications in which liquid crystal materials may be used. One of these properties is the alignment of liquid crystal material on a substrate.

LCs may be classified as thermotropic or lyotropic. Thermotropic LCs are orientationally ordered (or mesomorphic) within a specific temperature range. In contrast, lyotropic LC materials become mesomorphic when dissolved in a solvent (such as water) within an appropriate concentration range. The LC state occurs within an appropriate range of parameters such as temperature and concentration.

Lyotropic LCs are typically amphiphilic materials (surfactants) formed by molecules that have a polar (hydrophilic) head and a non-polar (hydrophobic) aliphatic tail. This dual character of the molecules leads to self-organization, for example, micelle formation, when they are dissolved in a solvent such as water or oil. When lyotropic LC molecules are in contact with a substrate, their amphiphilic nature generally results in a perpendicular orientation of the molecule with respect to the plane of the substrate. Either the polar head of the lyotropic LC is attracted to a polar substrate or the hydrophobic tail of the lyotropic LC molecule is attracted to a non-polar substrate. Either orientation results in a perpendicular alignment of the molecule with respect to the substrate. This perpendicular alignment means that the preferred orientation is the so-called homeotropic alignment, in which the optical axis (or director) is perpendicular to substrate. However, it can be difficult to align the surfactant-based lyotropic liquid crystal in a planar fashion where the director is in the plane of the solid substrate.

Lyotropic chromonic liquid crystals (LCLCs) differ in their structure from conventional lyotropic LCs. Conventional lyotropic liquid crystals, also referred to as surfactants, are based on amphiphilic rod-like molecules with polar heads and hydrophobic alkyl chain tails. The term chromonic is a short hand expression for phrases such as "lyotropic mesophase formed by soluble aromatic mesogens." The term was additionally intended to carry connotations of dyes and chromosomes and of the bischromone structure of disodium cromoglycate (DSCG), also known as cromolyn, one of the first identified solutes that form LCLCs. The molecular and macrostructure of LCLCs, as shown in FIG. 1, are generally plank-like or disk-like rather than rod-like, rigid rather than flexible, and aromatic rather than aliphatic. The LCLC molecules 10 have a relatively rigid plank-like or disc-like aromatic core 12 with polar solubilizing groups 14 at the periphery. Aggregation of these molecules, caused by face-to-face arrangement of aromatic cores, results usually in cylindrical stacks 16 with molecular planes being more or less perpendicular to the axis of the aggregate. The geometry of the basic structural unit in LCLCs is thus very different from the micelles, spherical or cylindrical, and bilayers formed by amphiphilic (surfactant) molecules in the regular lyotropic liquid crystals. The tendency to aggregate is observed even in very dilute solutions, thus LCLCs do not show a distinct threshold concentration similar to the critical micelle concentration in amphiphilic systems, except, perhaps, at the stage of dimer formation. In contrast to the closed micelles formed by many surfactants, the LCLC aggregates do not have a clearly defined size (length), as there is no geometric restriction to the addition of another molecule to the existing stack. Such a behavior, first observed in the studies of nucleic acid bases and nucleosides, is called "isodesmic."

Although π-π interactions are thought to be the main mechanism contributing to the face-to-face stacking, the hydrophobicity of the aromatic core of the LCLC certainly plays a role in the formation of rod-like aggregates. Hydrophilic ionic groups at the periphery of the molecules make the material water-soluble (see FIG. 1). The aggregates in water solution tend to be parallel to each other and often form the nematic type of liquid crystalline state, labeled N, in which the axes of rods are on average aligned along the same direction called the director, as shown in FIG. 1b.

Cromolyn, with the structural formula

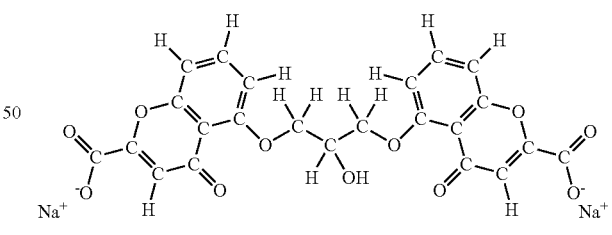

remains one of the most studied LCLCs. When dissolved in water, cromolyn forms two basic mesomorphic phases, labeled N and M. The details of the molecular aggregation in these two phases are still subject of discussion, but it is believed that in the M phase, the aggregates are parallel to each other and arrange into a hexagonal lattice. In the N phase, formed at larger dilutions (shown in FIG. 1b), this lattice disappears but the aggregates retain an orientational order, which makes the N phase similar to a regular nematic phase in thermotropic (solvent-free) materials composed of elongated rod-like molecules.

The details of molecular packing within the LCLC aggregates, including cromolyn, are still debated. Despite a lack of full understanding of supramolecular self-organization in LCLCs, it has become clear that some of these materials can be of practical use precisely because of their mesomorphic properties. U.S. Pat. Nos. 2,400,877 and 2,544,659, the disclosures of which are hereby incorporated by reference, provide oriented polarizing films of dichroic materials. Dye-based lyotropic LCs have been used in fabrication of polarizing films, as disclosed in U.S. Pat. Nos. 6,245,399, 6,541,185, and 6,699,533, the disclosures of which are also incorporated by reference herein. These materials have also been used in optical imaging as provided by U.S. Pat. No. 6,245,255, the disclosure of which incorporated by reference herein, in optical compensating elements, and in biological sensing elements, as disclosed in U.S. Pat. Nos. 6,171,802, 6,411,354 and 6,570,632, the disclosures of which are incorporated by reference herein.

All these applications take advantage of the fact that the structure of LCLC materials in the LC state is orientationally ordered. As the result, the LCLC samples exhibit useful structural and optical properties, such as birefringence, polarization ability, polarization-dependent absorption and polarization-dependent light transmittance, ability to align other materials (such as thermotropic LCs). In most cases, the LC state is used to prepare the LCLC films with uniform alignment through some deposition technique that implies shear. Shear induces specific alignment of the director and thus the structural units (molecules or their aggregates) with respect to the shear direction. Once the aligned structure is created by shear in the LC state, it can be "frozen" by evaporating the solvent. It is important that the shear-induced alignment is especially pronounced when the LCLC material is in the LC state. If the material is too diluted so that it is in the isotropic fluid state during the shear, the alignment is often lost. However, it is important to realize that the final ("dried") state of the material is not necessarily the state that satisfies the thermodynamic definition of the liquid crystalline or mesomorphic state.

In many of the applications above, such as polarizing, imaging and optical elements, one uses the dried-down films that are not necessarily in their liquid crystalline "mesomorphic" state anymore. Upon drying, the LCLC might display a variety of behaviors, as they might (a) crystallize; (b) form an amorphous solid in which the orientational order is largely preserved or "frozen", the material, however, cannot easily flow; (c) remain in the LC state, either the same state (that was originally prepared by dissolving the LCLC material in solvent) or a different state that exists at lower concentrations of solvent. For example, in case of DSCG, the nematic N phase might transform into the columnar M phase and then into a crystalline state upon drying. Therefore, any reference in this disclosure to "evaporated," "dried-down", or "dried" coating refers to coatings prepared from the LC state of LCLC materials in which the excess water (or other solvent) has been allowed to evaporate or has been removed by drying process, but which still retain an equilibrium moisture level typical of the conditions surrounding the sample.

The main feature allowing many LCLC applications in "dried" form is that when water evaporates, the resulting dry film still preserves an orientational order and thus anisotropic optical properties. Preserved in-plane long-range orientational order has been demonstrated not only for films of micron thickness but also for nanofilms comprised of just one or few stacked LCLC monolayers and fabricated by an electrostatic layer-by-layer deposition technique.

In practical applications of LCLCs, there is a great need for a uniform alignment of LCLC materials and the dried films formed from LCLC when water (or other solvent) is evaporated, with the director in the plane of the cell or slightly tilted relative to the plane of the cell. One of the biggest problems in using LCLCs in making such films is that the LCLC director might develop a periodic pattern of distortions, including director variations in the form of sinusoidal lines, that are often called "tiger stripes," "tiger texture" or 'banded' textures because of their characteristic textures under the polarizing microsope between crossed polarizers, as shown in FIG. 2a. Because of the director deviation from a unidirectional texture, the optical properties of the resulting dry films are poor.

The director orientation at the substrate may be characterized with reference to two angles. The angle "theta" is the angle between the normal to the substrate and the director. The angle "alpha" is the angle between the director projection onto the substrate and the fixed axis x in the substrate. It has been documented that one of the physical mechanisms of the appearance of "tiger stripes" in nematic liquid crystals is the difference in polar angle "theta" that the director makes with the normal to the top surface of the LC film and the normal to the bottom surface of the LC film. The "tiger strips" can, in principle, be characterized by modulation of either or both of these angles. However, even when "theta" is constant, for example, "theta"=Pi/2, the stripes can still exist because of the spatial variations of the angle "alpha" characterizing the director distortions in the plane of the substrate. In many applications, it is desired that the LCLC and the dried version of it align with the angles "alpha" and "theta" being constant across the sample.

Methods for the alignment of thermotropic LCs are known in the art. For example, U.S. Pat. No. 5,596,434 discloses that a substrate may be coated with a polymer and the polymer layer oriented, for example, by mechanical rubbing. The oriented film then provides an orientation direction for an overlaying thermotropic liquid crystal layer. However, such alignment techniques are not necessarily applicable to lyotropic LCs because of the structural differences between thermotropic and lyotropic LCs. U.S. Pat. No. 6,570,632, however, does disclose such a method of stable, planar alignment of LCLCs by an aligned polymer layer or by a vapor deposited layer of silicon oxide or a similar compound on a substrate. This technique is applicable when the LCLC remains in its dissolved form, i.e. the solvent (water) remains within the sample.

Previously, additives used in the production of thin dried films of the LCLC materials were surfactants, such as Triton X-100, that improve wetting of the LCLC solution on the substrate, salts, such as NaCl, that change the phase diagram of the mesomorphic state of LCLC materials, pH-adjusting additives such as ammonium hydroxide, dyes to change the spectral characteristics of the films, pretilt agents such as Glucopon 225 (available from Henkel Corporation) to provoke a suitable orientation of an adjacent liquid crystal, cross-linking agents to improve chemical resistance of the chromonic materials, and 4-(dimethylamino)pyridine (DMAP), which improves the optical clarity of the liquid crystalline material. However, no previously used dopant has provided a uniform director orientation.

Other techniques have also been suggested to impart a desired alignment to LCLCs. For example, it has been suggested to add a non-ionic surfactant to an LCLC, which can then be aligned by photo-treating an azobenzene-containing polymer to align the mixture of surfactant and LCLC. It is also known to align LCLCs in bulk solutions using a strong magnetic field applied to the LCLC cell. However, this field-induced alignment is only temporary as the degenerate (no fixed direction of molecular orientation) orientation returns within tens of minutes once the magnetic field is removed. Additionally, alignment of LCLC material may be accomplished by depositing alternating layers of polyion and LCLC on a substrate.

Aligned LC material may be used for the creation of polarizing films in LCDs. One of the known techniques of preparing polarizing films is by using water-soluble dye solutions that form LCLCs on glass or polymer substrates, see for example, U.S. Pat. No. 6,645,578, and U.S. Pat. No. 6,541,185. These films are visible to the human eye as they absorb in the visible part of the electromagnetic spectrum. The dyes form liquid crystal phases and tend to orient uniformly during the deposition of the solution on the substrate. However, closer inspection reveals numerous defects in the texture of the resulting film, such as the tiger stripes described above.

There is, therefore, a need to improve the alignment of the LCLC materials, to eliminate the defects such as periodic variations in director orientation and thus to improved optical properties, specifically, LCLC-based alignment films that have a more uniform alignment.

There is also a need for alignment films with alternate spectral characteristics. Usually, LCLC-based films are prepared from LCLC composed of dye solutions in water. These dyes usually adsorb in the visible part of the electromagnetic spectrum, i.e., between the wavelengths of 400 nm and 700 nm. The dye molecules are well aligned in the LC state and when this well-aligned state is preserved in the dried form, the film can be used as a polarizer. In a dried film, the dye molecules absorb light polarized in the plane of the molecules and do not absorb light polarized perpendicularly to the molecular plane. There is a need however, for a film with similar anisotropic absorption based on aligned LCLC materials for applications in other parts of the spectrum, such as UV (wavelength less than 400 nm) and IR (wavelength larger than 700 nm). These films function as an "invisible" polarizer in the UV or IR parts of the spectrum, transmitting any light that has the wavelength in the range 400-700 nm but absorbing part of light that has the wavelength above or below this range. Such a polarizer would be invisible to human eye but would be easily detected by a special UIV or IR "reader" device, and can be thus used for tagging and security purposes.

SUMMARY OF INVENTION

It is, therefore, an aspect of the present invention to provide alignment films with improved optical properties.

It is another aspect of the present invention to provide an alignment film that has improved uniformity of the alignment.

It is still another aspect of the present invention to provide an alignment film that absorbs and transmits light in predetermine ranges of the light spectrum.

It is yet another aspect of the present invention to provide an alignment film that does not display a periodic variation in the director orientation across the film.

In general, the present invention provides an aligned film comprising a dried mixture of a lyotropic chromonic liquid crystal material and a dopant, wherein the dopant is selected from the group consisting of chromonic dyes having a molecular weight within one order of magnitude of the lyotropic chromonic liquid crystal material and block co-polymers.

The present invention also provides a method of making an aligned film. The method comprises providing a mixture of a lyotropic chromonic liquid crystal material and a dopant in a solvent for the lyotropic chromonic liquid crystal material. The lyotropic chromonic liquid crystal material is in a mesomorphic state and the mixture is applied to a substrate. The solvent is removed to produce an aligned lyotropic chromonic liquid crystal-based film. According to this method, the dopant is selected from the group consisting of dyes having a molecular weight within one order of magnitude of the lyotropic chromonic liquid crystal material and block co-polymers.

BRIEF DESCRIPTION OF THE DRAWINGS

FIG. 3a is a graph showing the polarization characteristics of a Neutral Gray dye film cast with a block co-polymer;

FIG. 3b is a graph showing the polarization characteristics of a Neutral Gray dye film cast without a block co-polymer;

PREFERRED EMBODIMENT FOR CARRYING OUT THE INVENTION

Figure 1A:
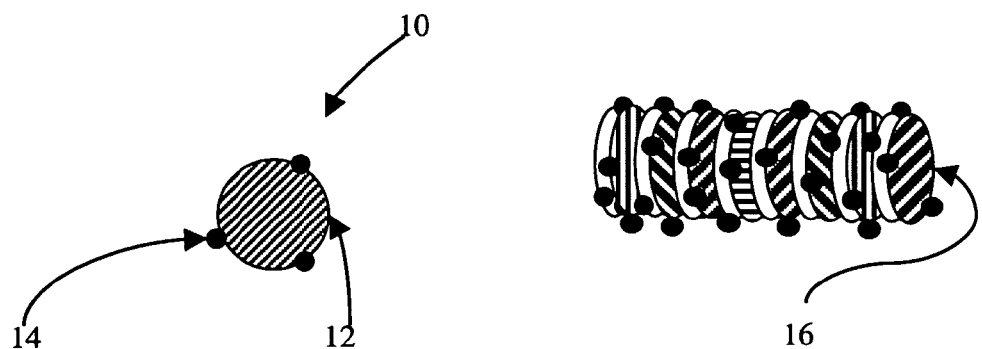
FIG. 1a is a schematic depiction of a single LCLC molecule and an elongated aggregate of LCLC molecules.
Figure 1B:
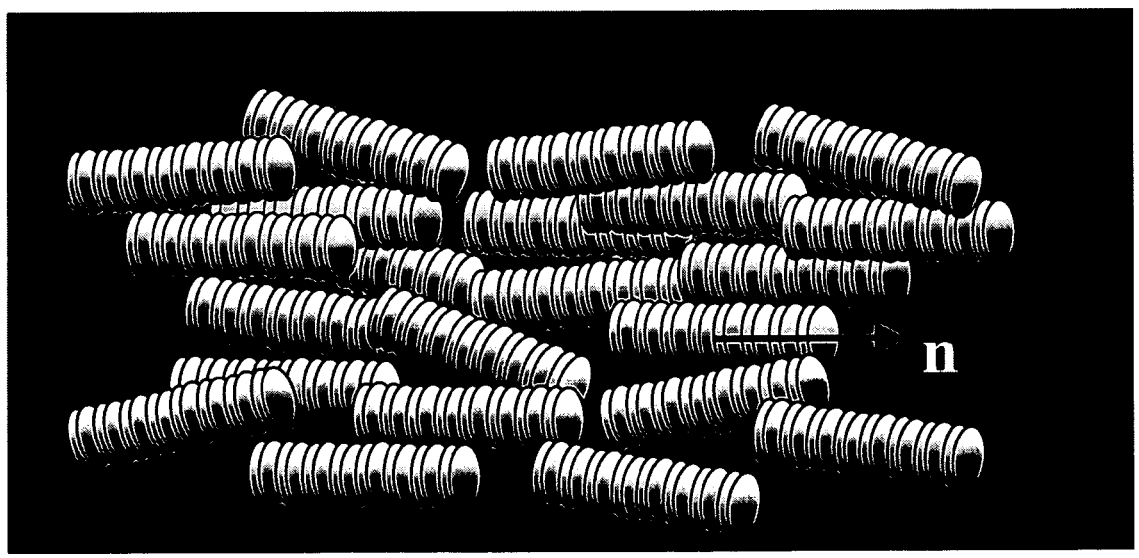
FIG. 1b is a schematic depiction of the nematic phase formed by the solution of rod-like LCLC aggregates.

The present invention is directed toward films prepared from the liquid crystalline state of LCLC. The films may possess a more uniform director orientation as a result of the presence of one or more dopants to the LCLC material. The dopant may improve the uniformity of the director alignment and thereby reduce or eliminate formation of defects such as tiger stripes caused by a periodic director orientation variation across the film. The dopant may be either a water-soluble block co-polymer or a chromonic dye. The co-polymers and dyes are believed to be capable of intercalation into the rod-like aggregates of the host LCLC material.

As mentioned above, LCLC materials have a molecular structure that includes a relatively rigid plank-like or disc-like aromatic core with polar solubilizing groups attached to the core and lying along its periphery. In one embodiment, the LCLC molecules may be summarized by formula I below.

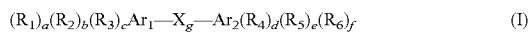

$(R_1)_a(R_2)_b(R_3)_c Ar_1—X_g—Ar_2(R_4)_d(R_5)_e(R_6)_f$ (I)

In formula I, $Ar_1$ and $Ar_2$ are the same or different aromatic groups, X is one or more of a bond, —NH—, —N=N—, $C_1$-$C_8$alkyl, $C_1$-$C_8$hydroxyalkyl, $C_1$-$C_8$alkyloxy, an imidazole, a non-heterocyclic aromatic group or a substituted non-heterocyclic aromatic group, $R_1$-$R_6$ are each independently a sulfite, a salt of a sulfite, a carboxyl, a salt of a carboxyl, a $C_1$-$C_4$ alkyl, an alkylamine, =O, or a halogen, a, b, c, d, e, and f are independently 0-2 and g is 1 or 2. In one particular example, $Ar_1$ and $Ar_2$ are independently selected from the group consisting of benzene, naphthalene, anthracene, benzimidazole, anthraquinone and benzopyran. In another example, $Ar_1$—X—$Ar_2$ together form perylene or a substituted perylene. It is envisioned that suitable LCLC materials include Violet 20(2.5-disulfonic acid diammonium salt-peryleno[3",4":3,4,5:10",9":3',4',5']dipyridino[1,2-a:1', 2'-a']bisbenzimidazol-6,11-diol), Blue 27 (6,15-Disulfonicacid-7,16-dichloro-6,15-dihydro-dinaptho[2,3-a:2',3'-h]phenazine-5,9,14,18-tetraone diammonium salt), cromolyn (disodium cromo glycate or DSCG), Acid Red 14 (4-hydroxy-3-((4-sulfo-1-naphthalenyl)azo)-1-naphthalenesulfonic acid disodium salt), C.I. Direct Blue 67 (4-hydroxy-5-[[4-[[1-hydroxy-6-(phenylamino)-3-sulfo-2-naphthalenyl]azo]-5-methoxy-2-methylphenyl]azo]-2,7-Naphthalenedisulfonic acid, trisodium salt), Methyl Orange ((Dimethylamino)phenylazo]benzenesulfonic acid sodium salt), Sirius Supra Brown RLL (2-((4'-sulfoniumphenyl azo)-5-(4'-ethoxyphenyl azo)naphthalene sulfonic acid disodium salt), RU31156 (7-(S-methylsulfonimidoyl)-5-(n-hexyl)-xanthen-9-one-2-carboxylic acid disodium salt), Copper-tetracarboxyphthalocyanine, Cyanine dye (methine di(3'-propylsulfonic acid, -6'-chloro)thiacarbocyanine triethylamine salt), C.I. Acid Red 266 (2-,6-amino-5-((4-chloro-2-(trifluoromethyl)phenyl)azo)-4-hydroxy-naphthalenesulfonic acid, monosodium salt), C.I. Direct Red 1 (5-[[4'-[(2-amino-8-hydroxy-6-sulfo-1-naphthalenyl)azo][1,1'-biphenyl]-4-yl]azo]-2-hydroxy-benzoic acid, disodium salt), C.I. Direct Red 2 (3,3'-((3,3'-dimethyl(1,1'-biphenyl)-4,4'-diyl)bis(azo))bis(4-amino-1-naphthalenesulfonic acid) disodium salt), C.I. Direct Red 28 (3,3'-[[1,1'-Biphenyl]-4,4'-diylbis(azo)]bis[4-amino-1-naphthalenesulfonic acid disodium salt), C.I. Acid Red 151 (4-((4-((2-hydroxy-1-naphthenyl)azo)phenyl)azo)-benzenesulfonic acid, monosodium salt, $C_{22}H_{16}N_4O_4S.Na$), Tartrazine (4,5-Dihydro-5-oxo-1-(4-sulphophenyl)-4-[(4-sulphophenyl)azo-1h-pyrazole-3-carbolyc acid), Quinacrine (6-Chloro-9-(4-diethylamino-1-methylbutylamino)-2-methoxyacridine dihydrochloride, C.I. Direct Brown 202, C.I. Acid Orange 2 (4-(2-hydroxynaphthylazo)benzenesulfonic acid sodium salt), Reactive Red 3:1 (trisodium 5-[[4-chloro-6-(phenylamino)-1,3,5-triazin-2-yl]amino]-4-hydroxy-3-[(2-sulphonatophenyl)azo]naphthalene-2,7-disulphonate), and sodium and ammonium salts of perylenetetracarboxylic bisimides.

A block copolymer is essentially a linear copolymer with chains composed of shorter linked homo-polymeric chains. These homo-polymer blocks can be either regularly alternating or random. Preferably, when the dopant is a block co-polymer, the monomeric blocks of the polymer differ in their hydrophilicity, with at least one of the polymer blocks being water soluble. A block co-polymer that contains monomer units that possess differing surface tension values may also be used. Poly(dimethylsiloxane-b-ethylene oxide), methoxypoly(ethylene glycol)-block-polyamidoamine dendrimer, poly(ethylene glycol)-b-poly(lactic acid), poly(ethylene oxide)-b-poly(methacrylic acid), and polyisobutylene-b-poly(methacrylic acid) are envisioned as being suitable block co-polymers in the present invention.

Chromonic dyes are water-soluble materials with flat, disk-like or plank-like molecules having a hydrophobic core and hydrophilic substituents on the periphery of the molecule. In one embodiment, the chromonic dye may be summarized by formula II below.

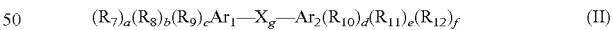

$(R_7)_a(R_8)_b(R_9)_c Ar_1—X_g—Ar_2(R_{10})_d(R_{11})_e(R_{12})_f$ (II)

In formula II, $R_7$-$R_{12}$ are independently $C_1$-$C_4$ alkyl, a sulfite, a salt of a sulfite, a carboxyl, a salt of a carboxyl, a hydroxyl, a $C_1$-$C_4$ alkylsulfite, a salt of a $C_1$-$C_4$ alkylsulfite, an alkylamine, =O, or a halogen, $Ar_1$ and $Ar_2$ are independently a benzene or an indole group, X is —CO—, —CONH—, an alkenyl, a cyclic aliphatic hydrocarbon, or a halogenated hydrocarbon, a, b, c, d, e, and f are independently 0-2 and g is 1 or 2.

While not wishing to condition patentability on any particular theory of operation, it is believed that a block co-polymer may establish a close polar orientation at the bottom and the top surfaces of the liquid crystal dye film, thereby providing a uniform orientation, characterized by a lessening or even elimination of 'tiger stripes' formation as observed under a polarizing microscope between crossed polarizers. The polymer may also provide additional advantages in preparation of the aligned films. For example, the block copolymer may decrease the evaporation rate of water during the drying of the film, improve the wetting of the liquid crystalline film on the substrate, and prevent sticking of the dye material to the coating edge of the doctor blade or other deposition tool. Thus, the present invention provides for greater economy in preparation of the aligned films by both conserving dye materials and providing for greater ease of cleanup. The block copolymer can also promote wetting of the deposited LCLC film at different substrates.

When the dopant is a chromonic dye, again without wishing to condition patentability on any particular theory of operation, it is believed that the dopant intercalates into the LCLC aggregates, thereby stabilizing the aggregates and thus modifying the material parameters of the mesomorphic state of the LCLC material. For example, if the dye interacts strongly with the host LCLC molecules, it will stabilize the rod-like aggregates, increasing the splay elastic constant of the material in the liquid crystalline state and also increasing the scalar order parameter of the film. It may be advantageous for the low molecular weight dye dopant to have an opposite electrostatic potential than the LCLC, thereby stabilizing the intercalation of the dopant into the aggregate. For example, an LCLC material having tendency to give up a positive charge in an aqueous solution such as disodium cromoglycate (DSCG) or Blue 27 (both of which are described in more detail below), could be doped with an additive such as Fast Violet B (also described more fully below), which contains pendent groups that are likely to attract a positive charge, to create a film according to the present invention. Alternatively, the guest molecule might intercalate into the rod-like aggregate even if it is of the same electric charge but of different chemical structure as compared to the host LCLC molecules.

As mentioned above, LCLC materials include dichroic dyes, that is, dyes that absorb one polarization of light more strongly than another. Films made from such materials are typically visible to the human eye because they absorb light in the visible portion of the electromagnetic spectrum. These include water-soluble dyes such as the dye Blue 27, available from Optiva, Inc. of San Francisco, Calif., which has the chemical structure:

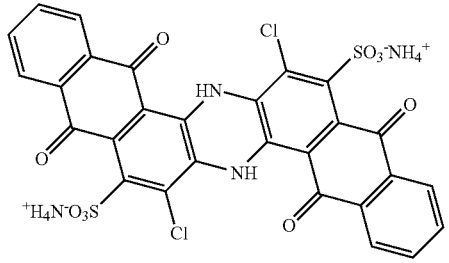

As its name implies, a film of Blue 27 has a dark blue color. This color can be altered by adding other dyes, such as a red dye, to the Blue 27 to provide a mixture that absorbs in a broad spectral range, such as a gray appearance when a red dye is added. By varying the composition of the LCLC, the adsorption bands may be shifted to different parts of the spectrum, including different portions of the visible spectrum (for example, red or blue) or outside the visible spectrum (UV or IR). For example, water solutions of disodium cromoglycate (DSCG, also referred to as cromolyn sodium or chromolyn, as mentioned above) may be used to prepare "invisible" polarizers that are transparent in the visible part of the spectrum (about 400-700 nm) but absorbs linearly polarized light in the UV (about 200-400 nm) and/or IR (above about 700 nm) portions of the spectrum.

This absorption is polarization-sensitive as the dried films deposited from LCLC solutions have an in-plane order. The alignment of films prepared from DSCG and thus their optical quality (polarizing efficiency outside the visible range and transparency in the visible part of the spectrum) can be improved by additives described in this invention.

The composition of the LCLC-based film may also be varied by choosing other dopants for the purpose of improved alignment and elimination of defects such as tiger stripes, including water-soluble chromic dyes having a molecular weight of the same order of magnitude as the molecular weight of the LCLC molecules. Similar to the LCLC molecules, the chromonic dyes typically have a plank-like or disc-like structure with a hydrophobic core and with hydrophilic substituents on the periphery of the molecule. It is believed that such molecules are capable of intercalating in the LCLC aggregate structure and changing the pH. Such additives can change the structural properties of the film such as the length or thickness of aggregates, elastic properties such as elastic constants, or viscosity coefficients such as shear viscosity coefficients, and the like, which results in the improved alignment of the dried LCLC films. Examples of such dopants include the dye Fast Violet B (4-Benzoylamino-2-methoxy-5-methylbenzeneamine), available from Sigma-Aldrich Corp. St. Louis, Mo., the structure of which may be shown as:

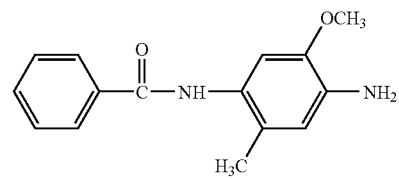

The molecular weight of Fast Violet B is 256.39, somewhat lower but of the same order of magnitude as the molecular weight of the LCLC materials such as cromolyn (512.3) and Blue 27 (685.8) shown above. It may also be noted that the structure of the Fast Violet B molecule makes it likely to attract a proton or other positive charge, while DSCG and Blue-27 molecules are more likely to part with a proton or other positive charge in an aqueous solution. Therefore, electrostatic attraction may help to accommodate the molecules of Fast Violet B in solutions of cromolyn, Blue 27 and similar LCLC materials and thus to alter the properties of the resulting LCLC phases such as the length of aggregates and their viscoelastic coefficient. Such alteration of properties results in improved optical films, in particular, the reduction or even elimination of director distortions (such as "tiger stripes"), thus improving the optical performance of anisotropic films based on LCLCs such as thin film polarizers.

In order to demonstrate the practice of the present invention, the following examples are provided. These examples should not be viewed as limiting the scope of the invention. The claims will serve to define the inventions.

Figure 2A:
FIG. 2a is a photomicrograph of a dried, sheared film from a 7.5% Blue 27 aqueous solution on glass, examined under a polarizing microscope at 50× magnification.
Figure 2B:
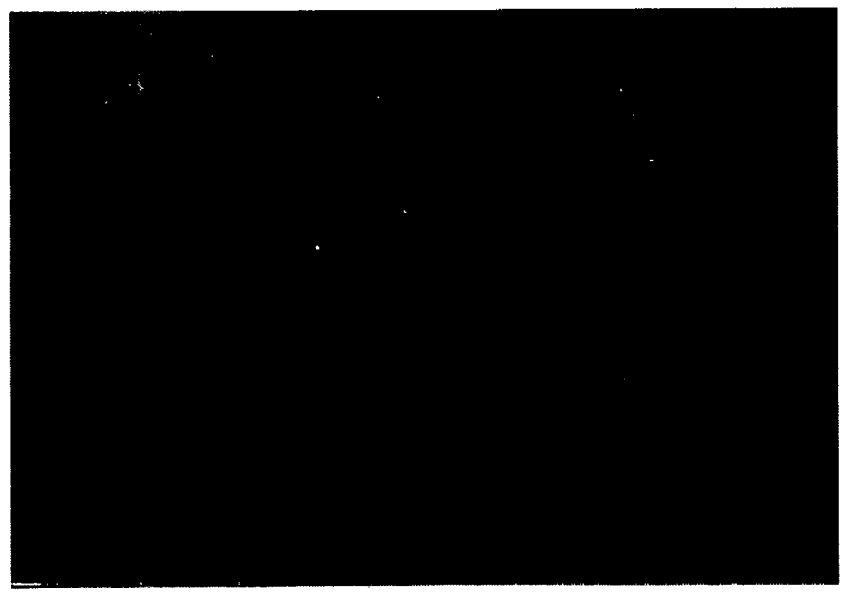
FIG. 2b is a photomicrograph of a dried, sheared film from a 7.5% Blue 27 aqueous solution with block co-polymer on glass, examined under a polarizing microscope at 50× magnification.

A small amount (0.01 gram) of poly (dimethylsiloxane-b-ethylene oxide) block co-polymer (MW=3000; 20:80 PDMS:PEO) purchased from Polysciences Inc, Warrington, Pa. was added to 0.40 grams of 7.5% Blue 27 dichroic dye (Optiva, Inc. of San Francisco, Calif.) aqueous solution. The components were mixed, and the mixture was deposited onto a glass substrate with a doctor blade and allowed to dry. The resulting film was then examined between crossed polarizers under a polarizing microscope. As shown in FIG. 2a, in a film from a dye solution without block copolymer deposited on a glass substrate, the above-mentioned "tiger stripes" are evident. However, with the block co-polymer (FIG. 2b), the bands do not appear in the Blue 27 film. A similar effect is observed when the block co-polymer is added to Violet 20 [Optiva, Inc. of San Francisco, Calif.,] (not shown). The block co-polymer/Blue 27 solution was also deposited onto polyester films (3M). The resulting film showed no banded textures (not shown).

Figures 4A, 4B:
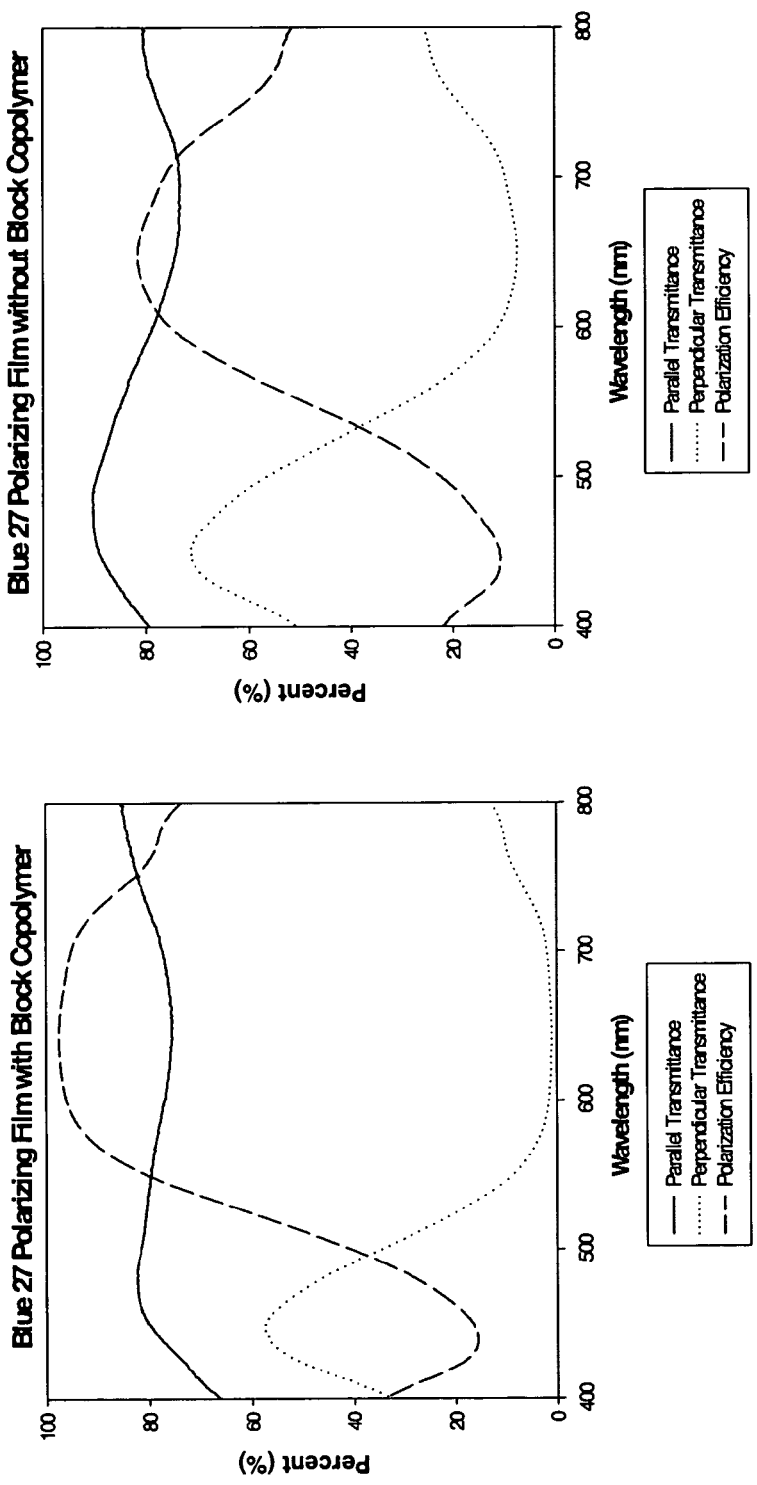
FIG. 4a is a graph showing the polarization characteristics of a Blue 27 dye film cast with a block co-polymer.
FIG. 4b is a graph showing the polarization characteristics of a Blue 27 dye film cast without a block co-polymer.
Figures 5A, 5B:
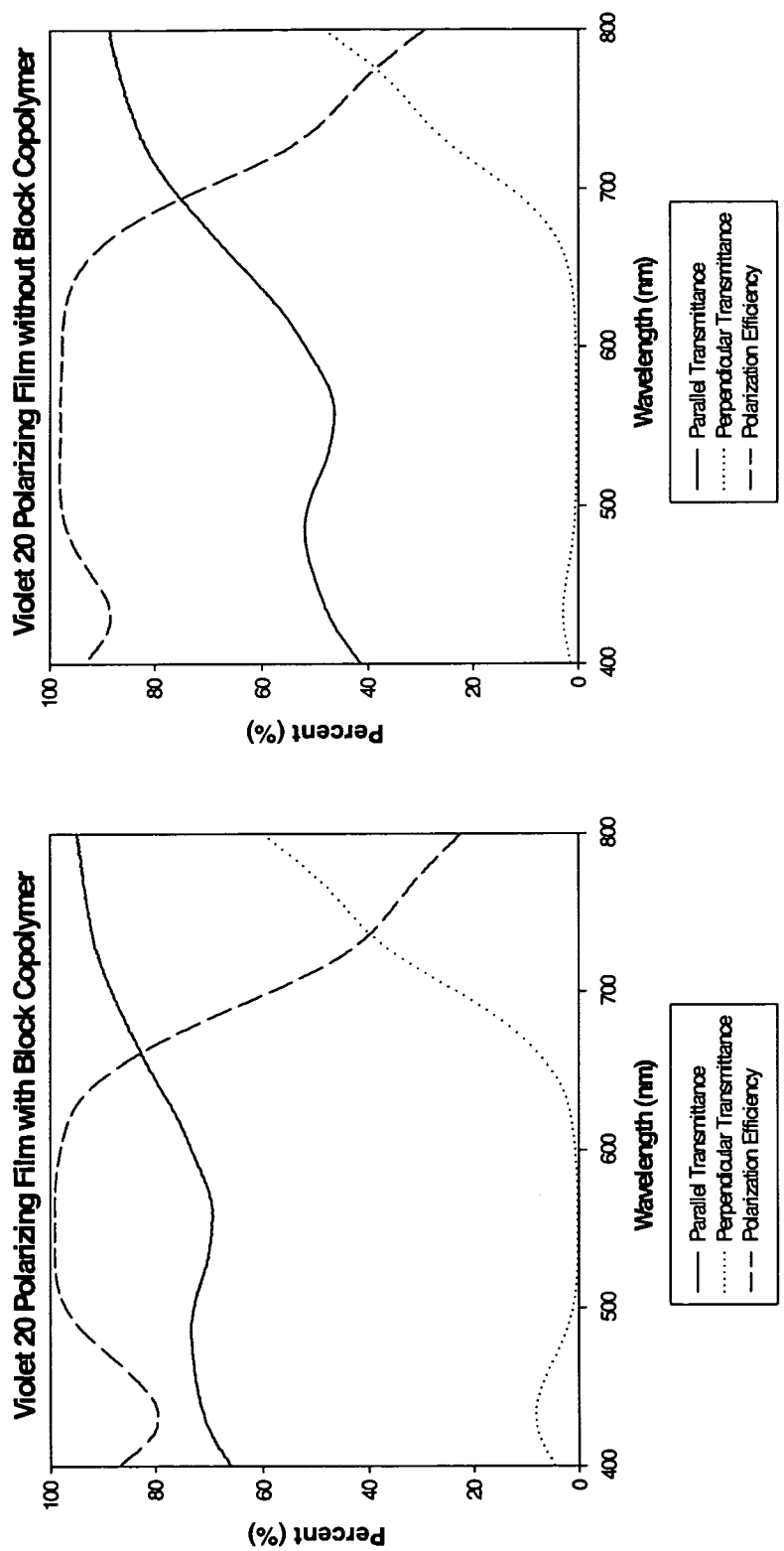
FIG. 5a is a graph showing the polarization characteristics of a Violet 20 dye film cast with a block co-polymer.
FIG. 5b is a graph showing the polarization characteristics of a Violet 20 dye film cast without a block co-polymer.

While not wishing to condition patentability on any particular theory of operation, the hypothesized mechanism of the present invention may be explained with reference to the PMDS-PEO block co-polymer of the above example. When a film of LCLC and block co-polymer mixture is cast, it is believed that the polymer with the lowest surface tension generally appears at the boundary of the free surface in order to minimize the surface free energy. Poly(dimethylsiloxane) (PDMS) has a low surface tension at room temperature relative to poly(ethylene oxide) (PEO), which has a surface tension of about twice that of PDMS. Also, PEO is hydrophilic whereas PDMS is non-polar. So when a small amount of this block co-polymer is mixed with the Blue 27 dye solution, the hydrophilic PEO has an affinity for the bulk of the dye solution while the PDMS has an affinity for the surface, minimizing the surface tension. Hence an effect is created where the dye is isolated from the bounding air interface and predominantly interacts with the hydrophilic PEO. It is also possible that the PDMS also has an affinity for the glass surface as well, because it has a siloxane end group, in which case, there are identical boundary conditions on both the top and the bottom of the film. This would allow the dye to be sheared and relax without director changes. Neutral Gray, Blue 27, and Violet 20 dye films (with and without a 20:80, PDMS:PEO block co-polymer additive) were synthesized as described above. The polarizing features of the resulting films were analyzed by "Lambda 18" spectrometer (Perkin-Elmer, Wellesley, Mass.). The transmittance and polarization properties exhibited by those films are presented in graph form in FIGS. 3a, 3b, 4a, 4b, 5a and 5b. In FIG. 3a, a lower perpendicular transmission is observed for a Neutral Gray film with the block co-polymer, indicating the presence of a more uniform texture, compared to a Neutral Gray film without the co-polymer (FIG. 3b). In FIGS. 4a and 4b, a higher polarization efficiency is observed for the Blue 27 film with the block-copolymer (FIG. 4a) compared to the Blue 27 film without co-polymer (FIG. 4b). In FIGS. 5a and 5b, a higher parallel transmission is displayed by the Violet 20 film with the block co-polymer (FIG. 5a) than that displayed by the Violet 20 film alone (FIG. 5b).

Figure 6:
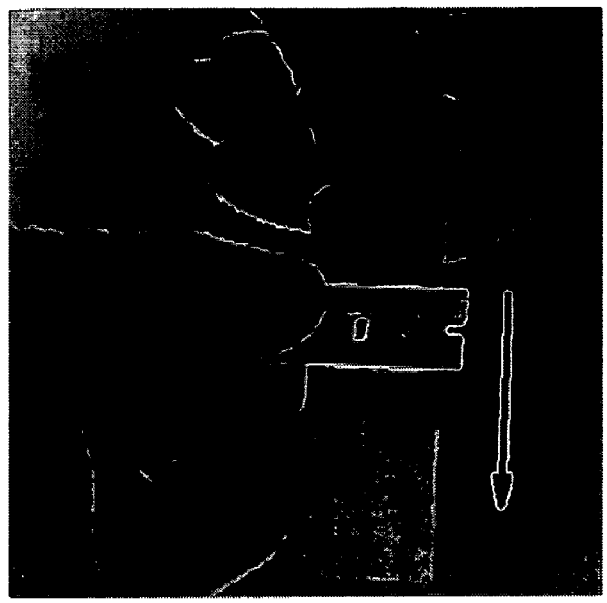
FIG. 6 is a photograph showing the application of an LCLC to a substrate using the back-side edge of a razor blade. The arrow shows the direction of the shearing.

The aligned film of the present invention was used to create an "invisible" polarizing film that polarizes ultraviolet (UV) light ($\lambda \approx 250\text{-}400$ nm) but is transparent to visible light. LCLC-based films were prepared from a 14% (wt) aqueous solution of disodium cromoglycate, which forms the chromonematic N-phase. The substrates were coated with a thin layer of this solution using a back edge of a razor blade, as shown in FIG. 6, with the arrow showing the direction of shearing. In this way, a layer of aqueous solution with LCLC director parallel to the shearing direction was formed. After drying, the LCLC layer became a solid film of thickness typically 0.8-1 µm.

Linearly polarized light was obtained by transmitting partially polarized light through a fused silica multiple-plate polarizer known as a so-called "pile-of-plates." The fused silica of the "pile of plates" polarizer is transparent in the UV region. The sample properties were determined with a "Lambda 18" spectrometer (Perkin-Elmer, Wellesley, Mass.) to characterize the sample transmittance of linearly polarized light.

Figure 7:
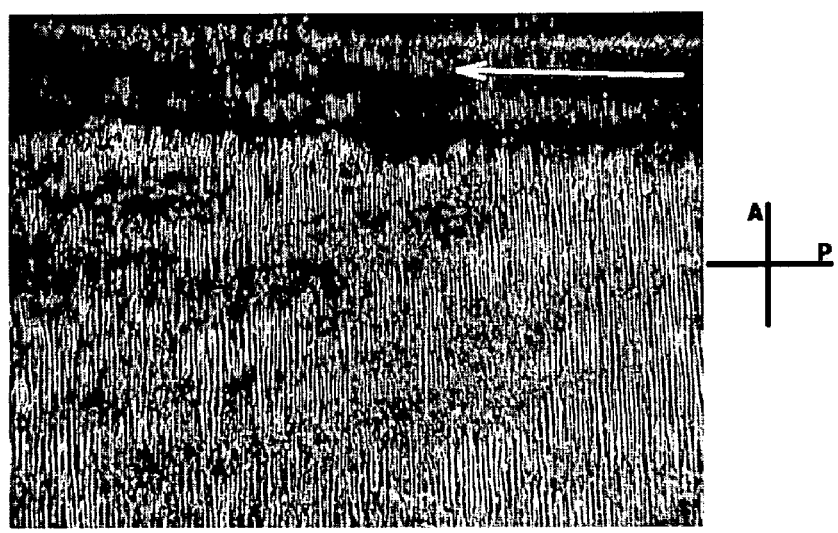
FIG. 7 is a photomicrograph of a dried LCLC film placed between two crossed polarizers in polarizing microscope.
Figure 8:
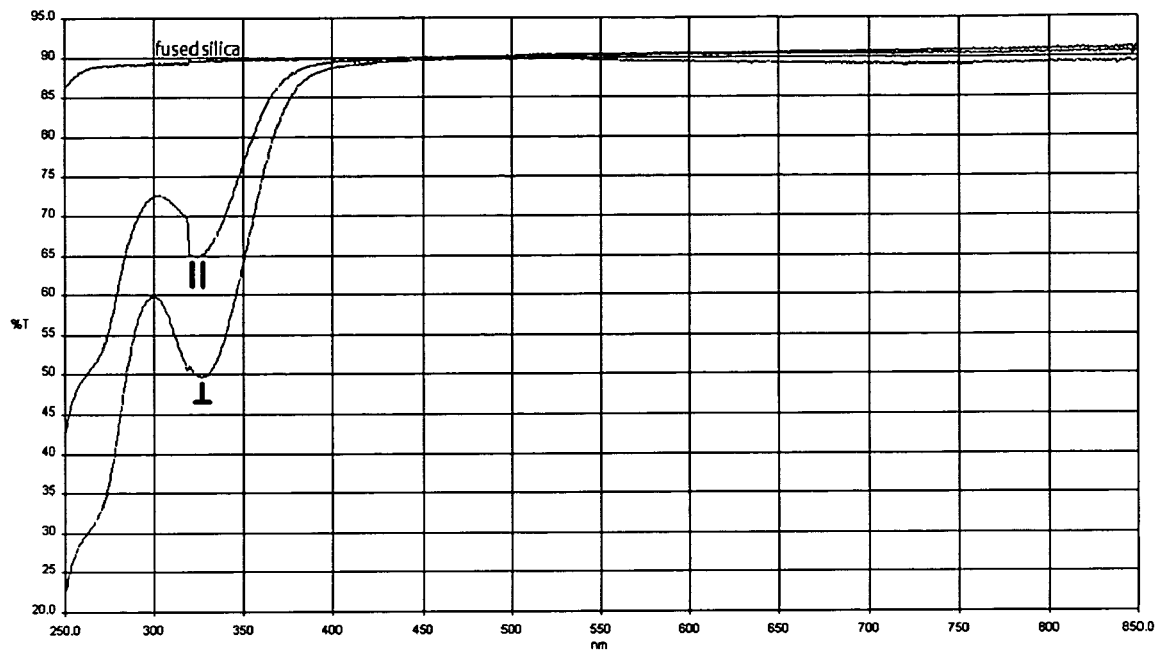
FIG. 8 is a graph showing the percent transmittance of a 0.8 μm thick film of LCLC for linearly polarized light parallel (II) and perpendicular (⊥) to the shearing direction, and the transmittance of clean fused silica substrate.

The texture of the dry LCLC film has a "tiger-stripe" texture when placed between two crossed polarizers in a polarizing microscope, as shown in FIG. 7. The arrow shows the shearing direction tilted at about 3 degrees with respect to the polarizer (P) axis. FIG. 8 shows the spectrum of a 0.8 µm thick film, obtained using light linearly polarized in the directions parallel and perpendicular to the shearing direction, and the transmittance of clean fused silica substrate as measured using a "Lambda 18" spectrometer (Perkin-Elmer). The dried film of LCLC demonstrates a significant difference in the transmittance of UV light (wavelength range 200-400 nm) linearly polarized along and perpendicular to the shearing direction. The film shows high transmittance ($\approx 99\%$) in the visible and near IR wavelength range 400-900 nm. The spectra clearly demonstrate that the film serves as a polarizer as the intensity of transmitted light is different for different polarizations for wavelengths smaller than 400 nm. Above 400 nm, the film is essentially transparent, although the residual scattering from the tiger stripe texture may make it "visible" to the naked eye.

To improve the efficiency of the LCLC-based thin film UV polarizer, a block copolymer (BC) was added to the cromolyn material. Two BCs of differing molecular weight were tested. The first (BC(a)) was a Poly(dimethylsiloxane-ethylene oxide) at a smaller MW=1200 (purchased from Polysciences Inc, Warrington, Pa.). The second, (BC(b)), was Poly(dimethylsiloxane-b-ethylene oxide) at a larger MW=3000 20:80 purchased from Polysciences, Inc (Warrington, Pa.). Both of the BCs contained 20 parts poly(dimethylsiloxane) [PDMS]—a low surface-tension, hydrophobic copolymer and 80 parts poly(ethylene oxide) [PEO]—a higher surface tension, hydrophilic copolymer, in their linear main-chain structure. Both BCs were tested by adding 0.005 g to 0.5 g to 14% (wt) aqueous solution of disodiumcromoglycate.

Figure 9:
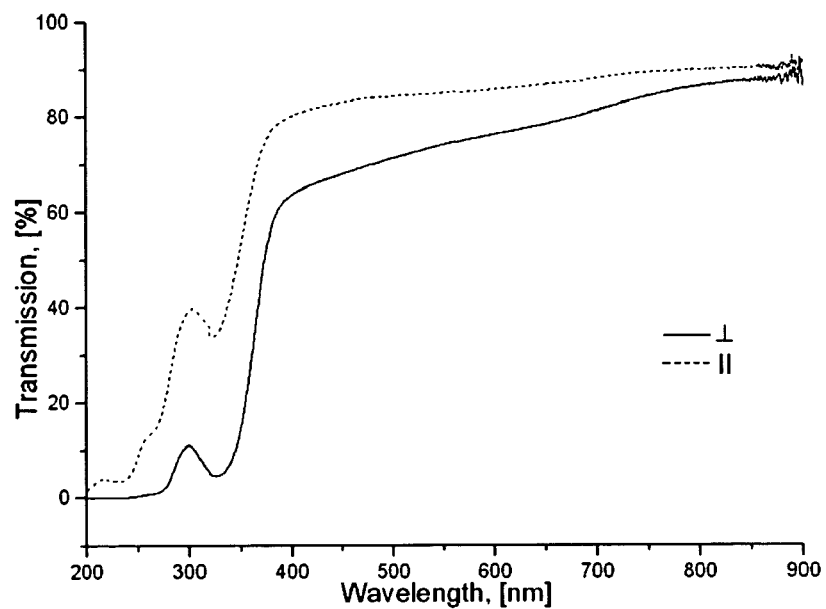
FIG. 9 is a graph showing the percent transmittance of a 0.5 μm thick film of LCLC+BC(b) for linearly polarized light parallel (II) and perpendicular (⊥) to the shearing direction.

The film layer with BC(b) showed significant improvement of polarization efficiency. FIG. 9 shows the transmission spectrum of a 500 nm thick dried film of sheared LCLC+BC(b). The transmittance of the film was determined using a beam with linear polarization parallel (∥) and perpendicular (⊥) to the shearing direction. The addition of block copolymer slightly increased the absorption of visible and near-IR polarized light ($\lambda \approx 400\text{-}900$ nm) and significantly changed the transmission of UV-light. The polarization efficiency may be calculated as:

$$V_{pe} = \left| \frac{T_{//} - T_\perp}{T_{//} + T_\perp} \right|.$$

Figure 10:
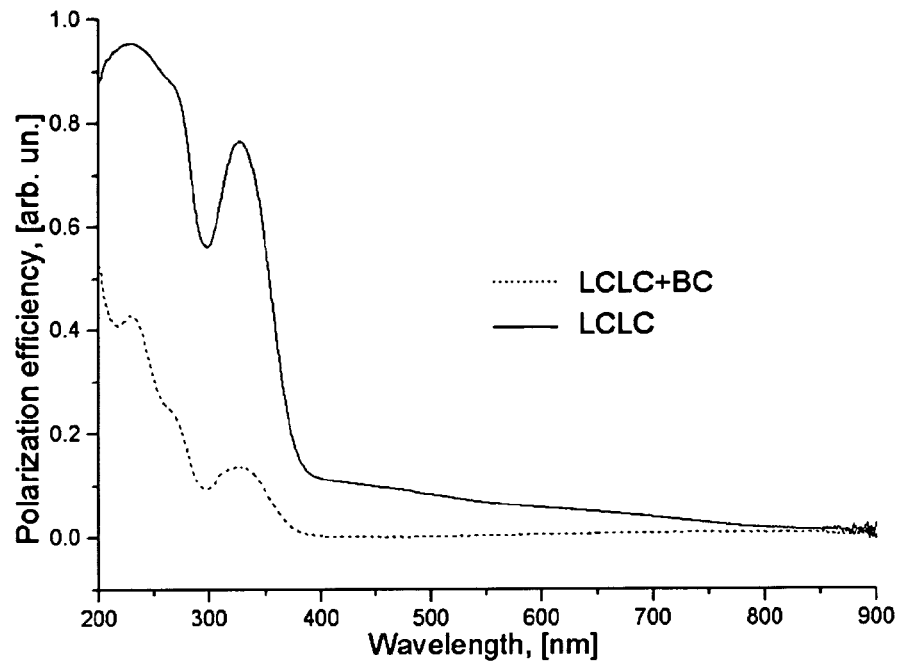
FIG. 10 is a graph showing the relative polarization efficiency of a 0.8 μm thick dried film of LCLC and 0.5 μm thick dried film of LCLC+BC(b)

FIG. 10 shows $V_{pe}$ vs. wavelength for a 0.8 µm thick film of LCLC and a 0.5 µm thick film of LCLC+BC(b). The polarization efficiency is clearly improved with the block co-polymer, despite the fact that the thickness of the BC-containing film is somewhat lower than the thickness of the "pure" LCLC film.

Figure 11:
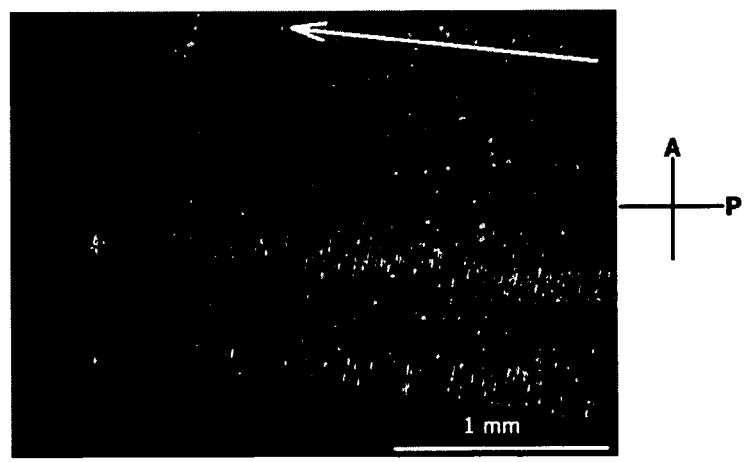
FIG. 11 is a photomicrograph of a dried LCLC+BC(b) film placed between two crossed polarizers under a polarizing microscope.
Figure 12:
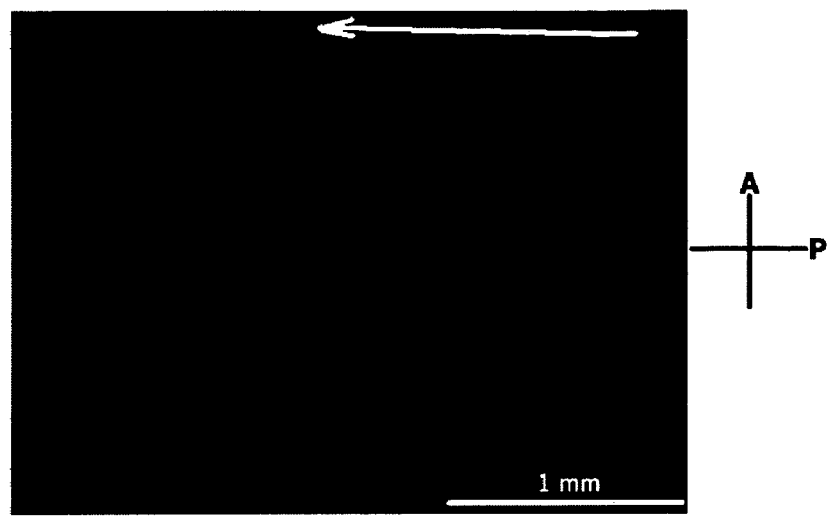
FIG. 12 is a photomicrograph of a dried LCLC+BC(a) film placed between two crossed polarizers under a polarizing microscope.

The efficiency of "tiger stripes" removal is somewhat different for BC(b) and BC(a). FIG. 11 demonstrates some remnant defects in the case of BC(b), whereas FIG. 12 shows a stripe-free texture using BC(a). In FIG. 11, the arrow shows the shearing direction tilted at ≈10 degree with respect to the polarizer (P) axis. In FIG. 12, the arrow shows the shearing direction tilted at ≈3 degree with respect to the polarizer (P) axis. This demonstrates the possibility of controlling the optical appearance and optical efficiency of LCLC films with different types of BCs. Such control may be utilized for tagging and security purposes.

Small-molecular weight additives may also improve the uniformity of director orientation in LCLC-based films, for example by modifying the length of LCLC aggregates, and/or their viscoelastic properties. Fast Violet B, mentioned above, is believed to be capable of intercalation into LCLC solutions in water. Fast Violet B dye also increases the absorption of UV light polarized normally to the shearing direction of the dried LCLC film. Fast Violet B dye shows absorption at approximately 297 nm.

Figure 13:
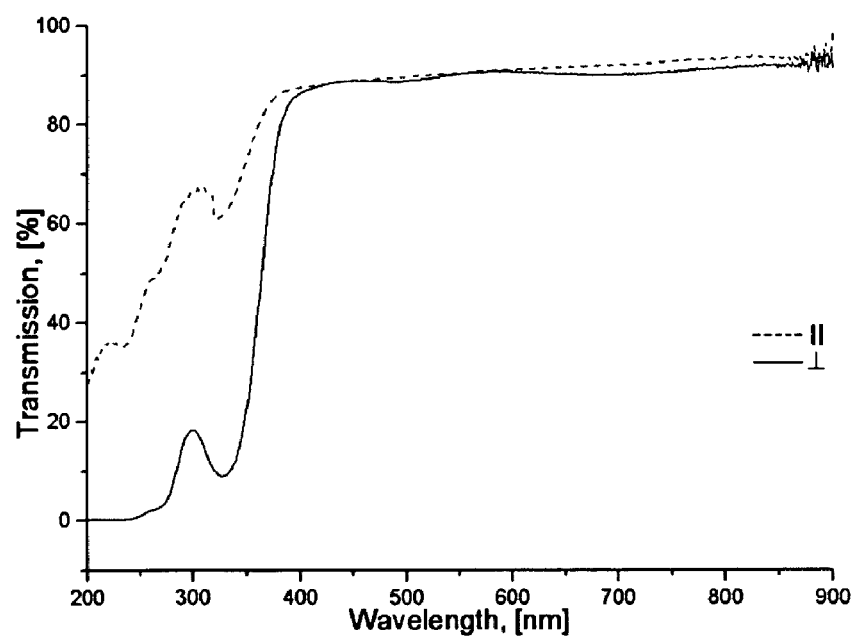
FIG. 13 is a graph showing the transmittance of a film of LCLC with Fast Violet B dye with linear polarization of a light beam parallel (II) and perpendicular (⊥) to the shearing direction of dried film.

In another dried film of LCLC, 0.0015 g of Fast Violet B dye powder was added to 0.9985 g of 14% (wt) aqueous solution of DSCG. The solution of LCLC and Fast Violet B dye was sheared with a doctor blade and dried in the air, as described above. The transmission properties of the resulting film were determined as also described above. FIG. 13 shows the transmission spectrum of an 800 nm thick dried LCLC film containing Fast Violet B dye, with linear polarization of light parallel (∥) and perpendicular (⊥) to the shearing direction of dried film.

Figure 14:
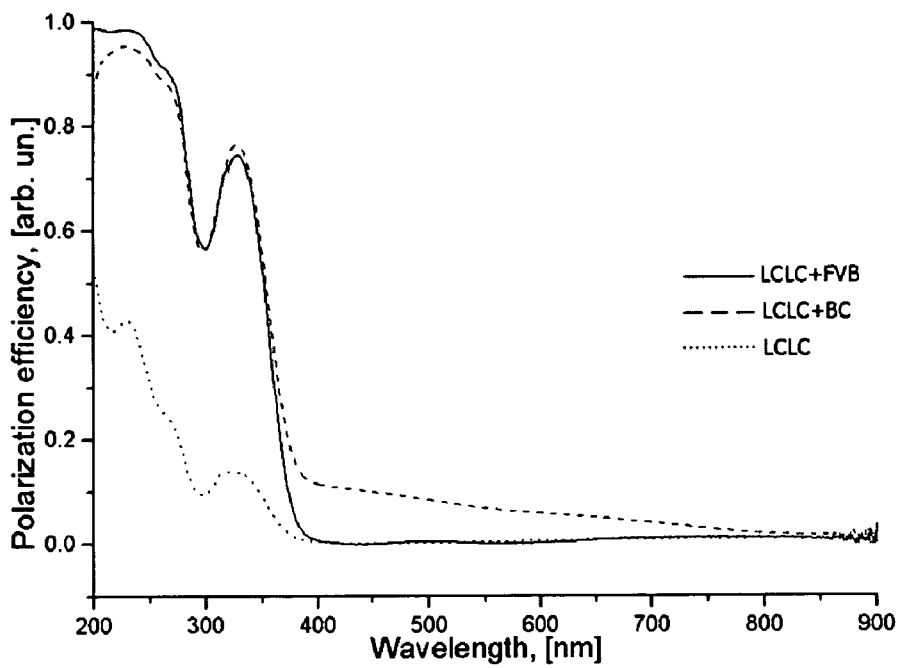
FIG. 14 is a graph of polarization efficiency vs. wavelength for films of LCLC with Fast Violet B dye (LCLC+FVB), LCLC with the block copolymer (LCLC+BC(b)), and neat LCLC.
Figure 15:
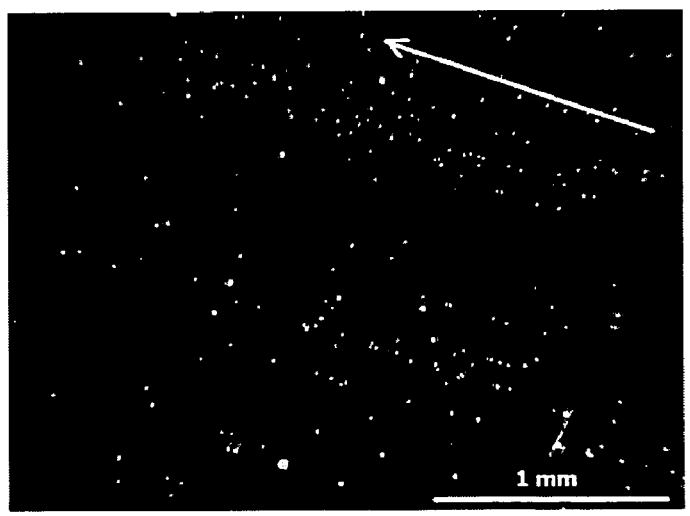
FIG. 15 is a photomicrograph of a dried film of LCLC with Fast Violet B dye placed between two crossed polarizers under a polarizing microscope.

FIG. 14 shows the polarization efficiency of an 800 nm thick dried LCLC film with Fast Violet B dye in comparison to the polarization efficiency of dried films of pure LCLC, LCLC with block copolymer of the same thickness. The LCLC/Fast Violet B film shows the best polarization efficiency for UV range between 200 and 300 nm. Moreover, the film of LCLC with Fast Violet B shows a high transmittance (≧90%) for visible and near-infrared light and no noticeable polarization capability in that wavelength range between 400 and 900 nm. The LCLC/Fast Violet B film also shows the minimum appearance of "tiger stripes" texture in image obtained using a polarizing microscope as it is shown in FIG. 15. The arrow shows the shearing direction tilted at ≈30 degree with respect to the polarizer (P) axis.

Figure 16:
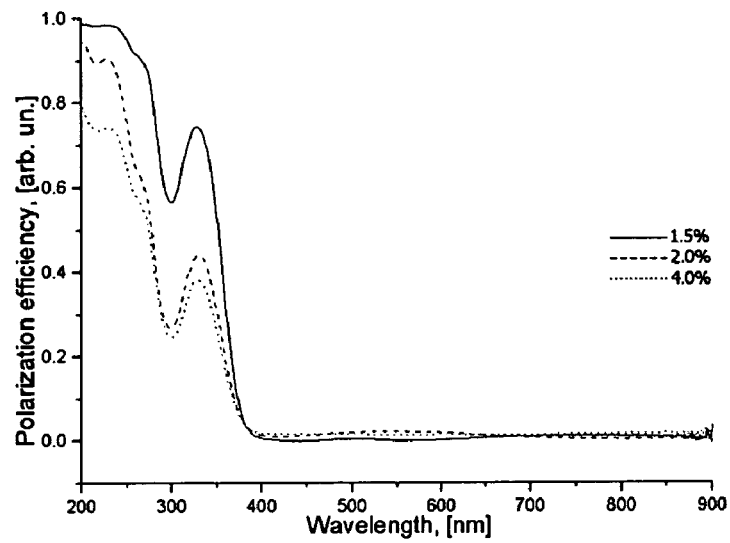
FIG. 16 is a graph of polarization efficiency vs. wavelength for dried films of LCLC with initial weight concentration of Fast Violet B dye of 0.15, 2.0 and 4.0%.

It should be noted that concentrations of Fast Violet B dye greater than or equal to about 2 percent in the LCLC/dopant solution decrease the polarization efficiency of the resulting LCLC film. Moreover, a high concentration of additive decreases the film transmittance in visible and near-infrared wavelength range. Therefore, the aligned film of the present invention is preferably a dried film from a solution containing less than about 4 percent dopant, and more preferably less than about 2 percent dopant. FIG. 16 shows the comparison between polarization efficiency of dried LCLC films with initial weight concentration of the Fast Violet B dye of 0.15, 2 and 5 percent in water solution. The concentration 0.15% of the Fast Violet B dye in the applied solution provides an increased uniformity in director orientation while minimizing any decrease in polarization efficiency.

The dopant may also be selected to enhance the polarization of light in the UV portion of the electromagnetic spectrum. A cromolyn film was synthesized with the dopant 2,2'-dihydroxybenzophenone ($C_{13}H_{10}O_3$, available from Sigma-Aldrich Corp., St. Louis, Mo.) as described above. 2,2'-dihydroxybenzophenone has the structure:

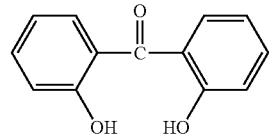

Figure 17:
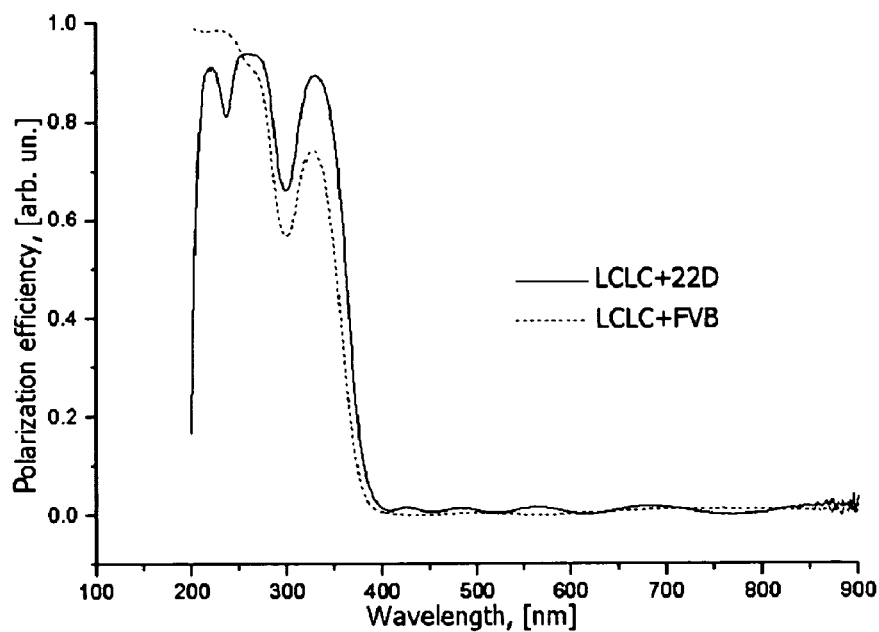
FIG. 17 is a graph comparing the polarization efficiency of an LCLC film with 2,2' dihydroxybenzonephenone to that of an LCLC film with Fast Violet B.

FIG. 17 compares the polarization efficiency of an 800 nm thick dried cromolyn film with 0.3% weight concentration of 2,2'-dihydroxybenzophenone dye to that of a cromolyn film with Fast Violet B dye (1.5%) of the same thickness. As shown in FIG. 17, the polarization efficiency for polarized UV light in the wavelength region of 300-400 nm is enhanced using 2,2'-Dihydroxybenzophenone (LCLC+22D) compared to Fast Violet B dye(LCLC+FVB).

A near infra-red (NIR) polarizer was formed using an LCLC material and the NIR dye IR-806 (2-[2-[2-chloro-3-[2-[1,3-dihydro-3,3-dimethyl-1-(4-sulfobutyl)-2H-indol-2-ylidene]-ethylidene]-1-cyclopenten-1-yl]-ethenyl]-3,3-dimethyl-1-(4-sulfobutyl)-3H-indolium hydroxide, inner salt sodium salt, $C_{37}H_{44}ClN_2NaO_6S_2$) purchased from Sigma-Aldrich Corp., St. Louis, Mo. IR-806 is water-soluble and has the chemical structure:

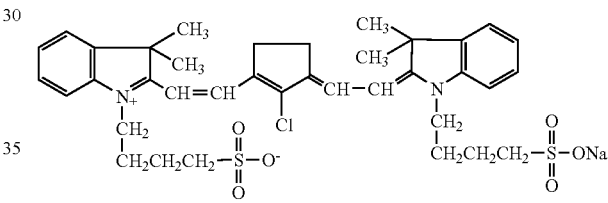

IR-806 dye shows a maximum of absorption at wavelength $\lambda_{ab} \approx 806$ nm. The molecular weight of IR-806 dye is 735.33 amu, which is of the same order of magnitude as the molecular weight of DSCG (468.38).

Figure 18A:
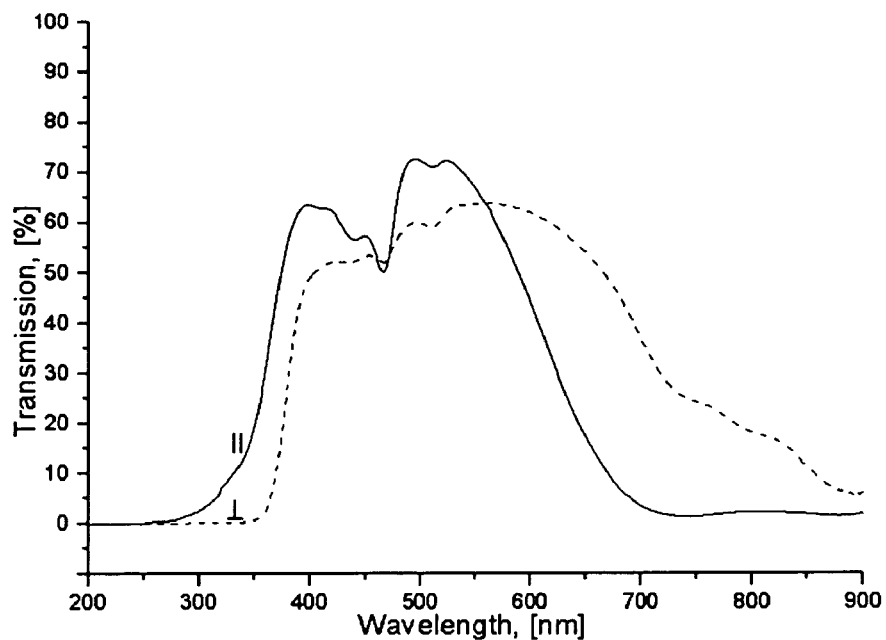
FIG. 18a is a graph showing the transmission spectrum of a film with IR-806 with linear polarization of a light beam parallel (II) and perpendicular ($\perp$) to the shearing direction of the dried film.
Figure 18B:
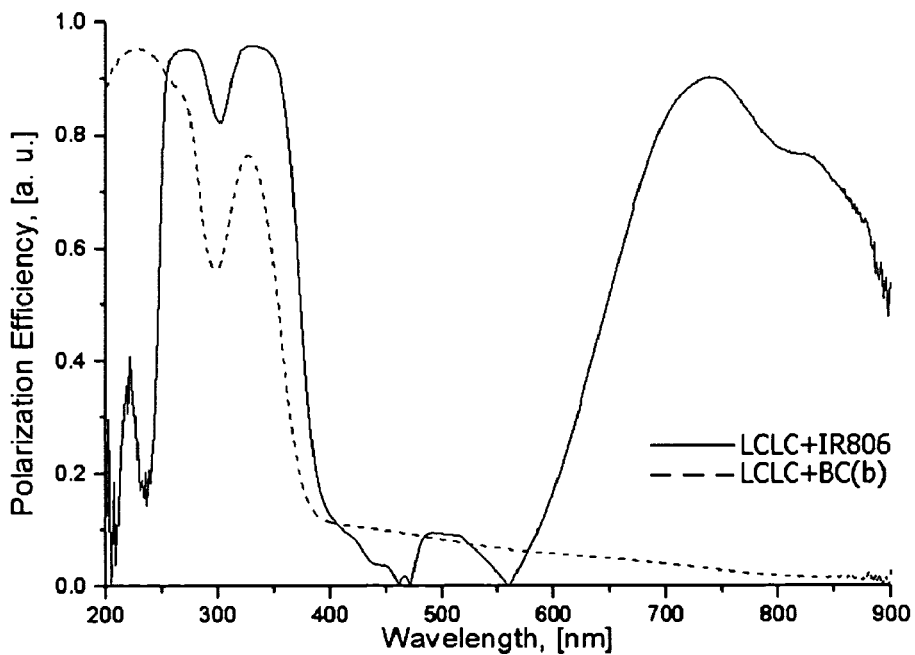
FIG. 18b is a graph comparing the polarization efficiency of a film with IR-806 to a film with Fast Violet B.

To obtain a dried film of LCLC with the NIR dye, two aqueous solutions were mixed in equal proportion: 14% (weight concentration) of chromolyn in water and 1 wt. % of IR-806 in water. The resulting mixture was sheared onto the surface of fused silica substrates using a doctor blade and was dried in the air. FIG. 18 shows two spectra of transmission (a) and polarization efficiency (b) obtained with 1 μm-thick dry film. The transmission spectrum of cromolyn with IR-806 dye additive for light polarized parallel (∥) and perpendicular (⊥) to the shearing direction is shown in FIG. 18a. The polarization efficiency of cromolyn with IR-806 dye (LCLC+IR806) dye in comparison to a cromolyn film with block copolymer (LCLC+BC(b)) is shown in FIG. 18b.

Dried films of the sheared aqueous solution of cromolyn and IR-806 dye demonstrate the ability to polarize light in both UV and NIR spectral regions. LCLC+IR806 film showed a polarization efficiency of about 0.9 for UV light in the spectral range between 275 and 375 nm. In NIR spectral range, between 700 and 800 nm, the same film showed a polarization efficiency around 0.85. In a visible part, between 400 and 550 nm, the tested dried film showed transmission around 60% and a polarization efficiency less than about 0.1. The directions of maximum absorption relative to the shearing direction in the UV and IR regions are different for the film containing IR806. In the UV region, maximum absorption is observed for light polarized perpendicular to the shearing direction, while in the NIR region, from 600 to 900 nm, maximum absorption is achieved for polarization of light parallel to the shear direction.

Based upon the foregoing disclosure, it should now be apparent that addition of dopants to LCLC materials will carry out the objects set forth hereinabove. It is, therefore, to be understood that any variations evident fall within the scope of the claimed invention and thus, the selection of specific component elements can be determined without departing from the spirit of the invention herein disclosed and described.

We claim:

1. An aligned film comprising a dried mixture of a lyotropic chromonic liquid crystal material and a dopant, wherein the dopant is selected from the group consisting of block co-polymers and chromonic dyes, the chromonic dyes having a molecular weight within one order of magnitude of the lyotropic chromonic liquid crystal material.

2. The aligned film of claim 1, wherein the film does not exhibit a periodic director orientation variation across the film.

3. The aligned film of claim 1, wherein the lyotropic chromonic liquid crystal material is represented by formula I,

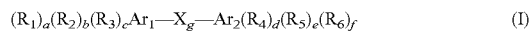

wherein $Ar_1$ and $Ar_2$ are the same or different aromatic groups, X is one or more of a bond, —NH—, —N═N—, a $C_1$-$C_8$ alkyl, a $C_1$-$C_8$ hydroxyalkyl, a $C_1$-$C_8$ alkyloxy, an imidazole, a non-heterocyclic aromatic group or a substituted non-heterocyclic aromatic group, $R_1$, $R_2$, $R_3$, $R_4$, $R_5$, and $R_6$ are each independently a sulfite, a salt of a sulfite, a carboxyl, a salt of a carboxyl, a $C_1$-$C_4$ alkyl, an alkylamine, ═O, or a halogen, a, b, c, d, e, and f are independently 0-2 and g is 1 or 2.

4. The aligned film of claim 3, wherein the lyotropic chromonic liquid crystal is selected from the group consisting of 2,5-disulfonic acid diammonium salt-peryleno[3'',4'': 3,4,5;10'',9'':3',4',5']dipyridino[1,2-a:1',2'-a']bisbenzimidazol-6,11-diol, 6,15-Disulfonicacid-7,16-dichloro-6,15-dihydro-dinaptho[2,3-a;2',3'-h]phenazine-5,9,14,18-tetraone diammonium salt, disodium cromoglycate, 4-hydroxy-3-((4-sulfo-1-naphthalenyl)azo)-1-naphthalenesulfonic acid disodium salt, 4-hydroxy-5-[[4-[[1-hydroxy-6-(phenylamino)-3-sulfo-2-naphthalenyl]azo]-5-methoxy-2-methylphenyl]azo]-2,7-naphthalenedisulfonic acid, trisodium salt, (Dimethylamino)phenylazo]benzenesulfonic acid sodium salt, 2-((4'-sulfoniumphenyl azo)-5-(4'-ethoxyphenyl azo)naphthalene sulfonic acid disodium salt, 7-(S-methylsulfonimidoyl)-5-(n-hexyl)-xanthen-9-one-2-carboxylic acid disodium salt, Copper-tetracarboxyphthalocyanine, methine di(3'-propylsulfonic acid, -6'-chloro)thiacarbocyanine triethylamine salt, 2-,6-amino-5-((4-chloro-2-(trifluoromethyl)phenyl)azo)-4-hydroxy-naphthalenesulfonic acid, monosodium salt, 5-[[4'-[(2-amino-8-hydroxy-6-sulfo-1-naphthalenyl)azo][1,1'-biphenyl]-4-yl]azo]-2-hydroxy-benzoic acid, disodium salt, 3,3'-((3,3'-dimethyl(1,1'-biphenyl)-4,4'-diyl)bis(azo))bis(4-amino-1-naphthalenesulfonic acid)disodium salt, 3,3'-[[1,1'-Biphenyl]-4,4'-diylbis(azo)]bis[4-amino-1-naphthalenesulfonic acid disodium salt, 4-((4-((2-hydroxy-1-naphthenyl)azo)phenyl)azo)-benzenesulfonic acid, monosodium salt, 4,5-Dihydro-5-oxo-1-(4-sulphophenyl)-4-[(4-sulphophenyl)azo-1h-pyrazole-3-carbolyc acid, 6-Chloro-9-(4-diethylamino-1-methylbutylamino)-2-methoxyacridine dihydrochloride, 4-(2-hydroxynaphthylazo)benzenesulfonic acid sodium salt, trisodium 5-[[4-chloro-6-(phenylamino)-1,3,5-triazin-2-yl]amino]-4-hydroxy-3-[(2-sulphonatophenyl)azo]naphthalene-2,7-disulphonate, and sodium and ammonium salts of perylenetetracarboxylic bisimides.

5. The aligned film of claim 4, wherein the lyotropic chromonic liquid crystal material is disodium cromoglycate.

6. The aligned film of claim 5 wherein the dopant comprises a block co-polymer, wherein the block co-polymer is poly(dimethylsiloxane-b-ethylene oxide) containing 20 parts poly(dimethylsiloxane) and 80 parts poly(ethylene oxide) and having a molecular weight of about 3000.

7. The aligned film of claim 1, wherein the film is transparent to light in the visible portion of the light spectrum but is not transparent to light of a predetermined linear polarization in at least one of the ultraviolet and infra-red portions of the electromagnetic spectrum.

8. The aligned film of claim 1, wherein the dopant comprises a block co-polymer wherein the block co-polymer results from the polymerization of two or more monomers wherein a first monomer is hydrophilic relative to a second monomer.

9. The aligned film of claim 8, wherein the block co-polymer is selected from the group consisting of poly (dimethylsiloxane-b-ethylene oxide), methoxypoly(ethylene glycol)-block-polyamidoamine dendrimer, poly(ethylene glycol)-b-poly(lactic acid), poly(ethylene oxide)-b-poly (methacrylic acid), and polyisobutylene-b-poly(methacrylic acid).

10. The aligned film of claim 1, wherein the dopant is a dye represented by formula II

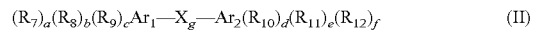

wherein, $R_7$, $R_8$, $R_9$, $R_{10}$, $R_{11}$, and $R_{12}$ are independently $C_1$-$C_4$ alkyl, a sulfite, a salt of a sulfite, a carboxyl, a salt of a carboxyl, a hydroxyl, a $C_1$-$C_4$ alkylsulfite, a salt of a $C_1$-$C_4$ alkylsulfite, an alkylamine, ═O, or a halogen, $Ar_1$ and $Ar_2$ are independently a benzene or an indole group, X is —CO—, —CONH—, an alkenyl, a cyclic aliphatic hydrocarbon, or a halogenated hydrocarbon, a, b, c, d, e, and f are independently 0-2 and g is 1 or 2.

11. The aligned film of claim 10, wherein the dopant is selected from the group consisting of 4-benzoylamino-2-methoxy-5-methylbenzeneamine, 2,2'-dihydroxybenzophenone, and 2-[2-[2-chloro-3-[2-[1,3-dihydro-3,3-dimethyl-1-(4-sulfobutyl)-2H-indol-2-ylidene]-ethylidene]-1-cyclopenten-1-yl]-ethenyl]-3,3-dimethyl-1-(4-sulfobutyl)-3H-indolium hydroxide, inner salt sodium salt.

12. A method of making an aligned film, the method comprising:
providing a mixture of a lyotropic chromonic liquid crystal material and a dopant in a solvent for the lyotropic chromonic liquid crystal material, wherein the lyotropic chromonic liquid crystal material is in a mesomorphic state;
applying the mixture to a substrate; and
removing the solvent to produce an aligned lyotropic chromonic liquid crystal-based film substantially without a periodic variation in the director orientation across the film,
wherein the dopant is selected from the group consisting of block co-polymers and dyes having a molecular weight within one order of magnitude of the lyotropic chromonic liquid crystal material.

13. The method of claim 12, wherein the mixture of a lyotropic chromonic liquid crystal material and dopant is provided in an aqueous solution.

14. The method of claim 12, wherein the lyotropic chromonic liquid crystal material is represented by formula I, $$(R_1)_a(R_2)_b(R_3)_c Ar_1-X_g-Ar_2(R_4)_d(R_5)_e(R_6)_f \quad (I)$$

wherein $Ar_1$ and $Ar_2$ are the same or different aromatic groups, X is one or more of a bond, —NH—, —N=N—, a $C_1$-$C_8$ alkyl, a $C_1$-$C_8$ hydroxyalkyl, a $C_1$-$C_8$ alkyloxy, an imidazole, a non-heterocyclic aromatic group or a substituted non-heterocyclic aromatic group, $R_1$, $R_2$, $R_3$, $R_4$, $R_5$, and $R_6$ are each independently a sulfite, a salt of a sulfite, a carboxyl, a salt of a carboxyl, a $C_1$-$C_4$ alkyl, an alkylamine, =O, or a halogen, a, b, c, d, e, and f are independently 0-2 and g is 1 or 2.

15. The method of claim 14, wherein the lyotropic chromonic liquid crystal material is selected from the group consisting of of 2,5-disulfonic acid diammonium salt-peryleno[3",4":3,4,5;10",9":3',4',5']dipyridino[1,2-a:1',2'-a'] bisbenzimidazol-6,11-diol, 6,15-Disulfonicacid-7,16-dichloro-6,15-dihydro-dinaptho[2,3-a;2',3'-h]phenazine-5,9,14,18-tetraone diammonium salt, disodium cromoglycate, 4-hydroxy-3-((4-sulfo-1-naphthalenyl)azo)-1-naphthalenesulfonic acid disodium salt, 4-hydroxy-5-[[4-[[1-hydroxy-6-(phenylamino)-3-sulfo-2-naphthalenyl]azo]-5-methoxy-2-methylphenyl]azo]-2,7-Naphthalenedisulfonic acid, trisodium salt, (Dimethylamino)phenylazo]benzenesulfonic acid sodium salt, 2-((4'-sulfoniumphenyl azo)-5-(4'-ethoxyphenyl azo)naphthalene sulfonic acid disodium salt, 7-(S-methylsulfonimidoyl)-5-(n-hexyl)-xanthen-9-one-2-carboxylic acid disodium salt, Copper-tetracarboxyphthalocyanine, methine di(3'-propylsulfonic acid, -6'-chloro)thiacarbocyanine triethylamine salt, 2-,6-amino-5-((4-chloro-2-(trifluoromethyl)phenyl)azo)-4-hydroxy-naphthalenesulfonic acid, monosodium salt, 5-[[4'-[(2-amino-8-hydroxy-6-sulfo-1-naphthalenyl)azo][1,1biphenyl]-4-yl]azo]-2-hydroxy-benzoic acid, disodium salt, 3,3'-((3,3'-dimethyl(1,1'-biphenyl)-4,4'-diyl)bis(azo)) bis(4-amino-1-naphthalenesulfonic acid)disodium salt, 3,3'-[[1,1'-Biphenyl]-4,4'-diylbis(azo)]bis[4-amino-1-naphthalenesulfonic acid disodium salt, 4-((4-((2-hydroxy-1-naphthenyl)azo)phenyl)azo)-benzenesulfonic acid, monosodium salt, 4,5-Dihydro-5-oxo-1-(4-sulphophenyl)-4-[(4-sulphophenyl)azo-1h-pyrazole-3-carbolyc acid, 6-Chloro-9-(4-diethylamino-1-methylbutylamino)-2-methoxyacridine dihydrochloride, 4-(2-hydroxynaphthylazo) benzenesulfonic acid sodium salt, trisodium 5-[[4-chloro-6-(phenylamino)-1,3,5-triazin-2-yl]amino]-4-hydroxy-3-[(2-sulphonatophenyl)azo]naphthalene-2,7-disulphonate, and sodium and ammonium salts of perylenetetracarboxylic bisimides.

16. The method of claim 12, wherein the lyotropic chromonic liquid crystal material is disodium cromoglycate.

17. The method of claim 16, wherein the dopant is a dye represented by formula II $$(R_7)_a(R_8)_b(R_9)_c Ar_1-X_g-Ar_2(R_{10})_d(R_{11})_e (R_{12})_f \quad (II)$$

wherein, $R_7$, $R_8$, $R_9$, $R_{10}$, $R_{11}$, and $R_{12}$ are independently $C_1$-$C_4$ alkyl, a sulfite, a salt of a sulfite, a carboxyl, a salt of a carboxyl, a hydroxyl, a $C_1$-$C_4$ alkylsulfite, a salt of a $C_1$-$C_4$ alkylsulfite, an alkylamine, =O, or a halogen, $Ar_1$ and $Ar_2$ are independently a benzene or an indole group, X is —CO—, —CONH—, an alkenyl, a cyclic aliphatic hydrocarbon, or a halogenated hydrocarbon, a, b, c, d, e, and f are independently 0-2 and g is 1 or 2.

18. The method of claim 12, wherein the dopant is a block co-polymer that is a product of the polymerization of two or more monomers wherein a first monomer is hydrophilic relative to a second monomer.

19. The method of claim 18, wherein the block co-polymer is selected from the group consisting of poly(dimethylsiloxane-b-ethylene oxide), methoxypoly(ethylene glycol)-block-polyamidoamine dendrimer, poly(ethylene glycol)-b-poly(lactic acid), poly(ethylene oxide)-b-poly(methacrylic acid), and polyisobutylene-b-poly(methacrylic acid).

20. The method of claim 19, wherein the block co-polymer is poly(dimethylsiloxane-b-ethylene oxide).

* * * * *

UNITED STATES PATENT AND TRADEMARK OFFICE
CERTIFICATE OF CORRECTION

| | |
|---|---|
| PATENT NO. | : 7,294,370 B2 |
| APPLICATION NO. | : 10/920551 |
| DATED | : November 13, 2007 |
| INVENTOR(S) | : Lavrentovich et al. |

It is certified that error appears in the above-identified patent and that said Letters Patent is hereby corrected as shown below:

IN THE CLAIMS:

In Claim 15, column 17, line 20, delete "of of" and insert --of--

In Claim 15, column 17, line 39, delete "1biphenyl" and insert --1'-biphenyl--

Signed and Sealed this

Thirteenth Day of May, 2008

JON W. DUDAS
*Director of the United States Patent and Trademark Office*